US012676529B2

(12) United States Patent

Xu et al.

(10) Patent No.: US 12,676,529 B2

(45) Date of Patent: Jul. 7, 2026

(54) STATOR, MOTOR, AND ELECTRIC VEHICLE

(71) Applicant: Huawei Digital Power Technologies Co., Ltd., Shenzhen (CN)

(72) Inventors: Haisong Xu, Shanghai (CN); Shaobo Yang, Dongguan (CN); Bayaer Eerhemu, Shanghai (CN); Yongjian Wan, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 246 days.

(21) Appl. No.: 18/513,724

(22) Filed: Nov. 20, 2023

(65) Prior Publication Data

US 2024/0088741 A1 Mar. 14, 2024

Related U.S. Application Data

(63) Continuation of application No. PCT/CN2022/091775, filed on May 9, 2022.

(30) Foreign Application Priority Data

May 21, 2021 (CN) .......................... 202110556357.8

(51) Int. Cl.
 *H02K 1/20* (2006.01)
 *H02K 5/15* (2006.01)
 (Continued)

(52) U.S. Cl.
 CPC ............... *H02K 5/203* (2021.01); *H02K 5/15* (2013.01); *H02K 9/19* (2013.01); *B60K 1/00* (2013.01); *B60K 2001/006* (2013.01)

(58) Field of Classification Search
 CPC ............. H02K 1/20; H02K 5/203; H02K 3/24
 See application file for complete search history.

(56) References Cited

U.S. PATENT DOCUMENTS

2023/0318370 A1* 10/2023 Liu ........................ H02K 9/193
 310/59

FOREIGN PATENT DOCUMENTS

CN 109450128 A * 3/2019 ............... H02K 1/20
CN 109494898 A 3/2019
 (Continued)

OTHER PUBLICATIONS

CN-113113978-A Machine Translation (Year: 2021).*
CN-109450128-A Machine Translation (Year: 2019).*
CN-211239470-U Machine Translation (Year: 2020).*

*Primary Examiner* — Oluseye Iwarere
*Assistant Examiner* — Masoud Vaziri
(74) *Attorney, Agent, or Firm* — Maier & Maier, PLLC

(57) ABSTRACT

A stator, a motor, and an electric vehicle are provided. The stator includes: a housing, where the housing has an accommodation space, and an oil inlet is disposed on the housing; a ring-shaped iron core punching sheet, where the iron core punching sheet is disposed in the accommodation space, and abuts against an inner wall of the housing; a spacer sleeve, where the spacer sleeve is sleeved in the iron core punching sheet, an outer surface of the spacer sleeve abuts against a side that is of the tooth part and that faces away from the yoke part, and a slot opening of the stator slot fits with the spacer sleeve to form a third cooling channel; and a flow guiding assembly, where the flow guiding assembly is disposed in the accommodation space. The three-layer oil-injection cooling design can improve a heat dissipation capability of the stator.

17 Claims, 24 Drawing Sheets

100

(51) Int. Cl.
    *H02K 5/20*             (2006.01)
    *H02K 9/19*             (2006.01)
    *B60K 1/00*             (2006.01)

(56)             References Cited

FOREIGN PATENT DOCUMENTS

| | | | | |
|---|---|---|---|---|
| CN | 109617319 | A | | 4/2019 |
| CN | 109698574 | A | | 4/2019 |
| CN | 110247485 | A | | 9/2019 |
| CN | 110808645 | A | | 2/2020 |
| CN | 211239470 | U | * | 8/2020 |
| CN | 112615445 | A | | 4/2021 |
| CN | 113113978 | A | * | 7/2021 ............... H02K 9/19 |
| CN | 114337012 | A | | 4/2022 |

* cited by examiner

01

<u>001</u>

<u>02</u>

100

100

100

20a

42

100

100

20a

20a

100

200

100

300

200

STATOR, MOTOR, AND ELECTRIC VEHICLE

CROSS-REFERENCE TO RELATED APPLICATIONS

This application is a continuation of International Application No. PCT/CN2022/091775, filed on May 9, 2022, which claims priority to Chinese Patent Application No. 202110556357.8, filed on May 21, 2021. The disclosures of the aforementioned applications are hereby incorporated by reference in their entireties.

TECHNICAL FIELD

The embodiments relate to the field of motor technologies, a stator, a motor, and an electric vehicle.

BACKGROUND

A motor in a powertrain of an electric vehicle includes a rotor and a stator. With development of electric vehicles, there is an increasing requirement for a high speed and miniaturization of the motor in the powertrain of the electric vehicle. To maintain same power as an existing powertrain, a maximum rotation speed and current density of the motor need to be further increased. Therefore, it is particularly important to design a cooling structure of the stator in the motor. In the conventional technology, a cooling manner is to dispose a slot at a root of a corresponding stator tooth to guide oil, and another cooling manner is to insert a cooling pipe into the stator. However, in the first cooling manner, there is only one layer of cooling channel, and a cooling capability is insufficient, and consequently it is difficult to cope with increasingly high power density of the motor. In addition, electromagnetic performance of the stator in the motor is affected because an oil passage is disposed in the middle of the stator tooth. Compared with the first cooling manner, in the second cooling manner, there are two layers of cooling channels, but it is still difficult to cope with the increasingly high power density of the motor, and in the second cooling manner, a structure is complex, resulting in a complex manufacturing process and high costs.

Therefore, how to provide a stator with a high heat dissipation capability is an urgent problem to be resolved.

SUMMARY

The embodiments include a stator, a motor, and an electric vehicle, to provide a stator with a high heat dissipation capability to meet an increasingly high power density requirement of a motor.

According to a first aspect, the embodiments provide a stator. The stator includes a housing, an iron core punching sheet, a spacer sleeve, and a flow guiding assembly. The iron core punching sheet is sleeved in an accommodation cavity of the housing, and an outer edge of the iron core punching sheet abuts against an inner wall of the housing. For example, the iron core punching sheet includes a yoke part and a plurality of tooth parts, the plurality of tooth parts is evenly distributed on an inner side of the yoke part in a circumferential direction, and a stator slot is disposed between adjacent tooth parts. It should be noted that in the stator, a first cooling channel is disposed between an outer edge of the yoke part and the housing. The first cooling channel may cool an outer surface of the iron core punching sheet. In addition, a second cooling channel is disposed on an inner edge of the yoke part, and the second cooling channel is located between adjacent tooth parts. The second cooling channel may cool a root of the stator slot. The spacer sleeve is sleeved in the iron core punching sheet, and an outer surface of the spacer sleeve abuts against a side that is of the tooth part and that faces away from the yoke part. It should be noted that a slot opening of the stator slot between the adjacent tooth parts fits with the spacer sleeve to form a third cooling channel. The third cooling channel may cool a slot opening position of the stator slot. It should be understood that the flow guiding assembly is disposed in the accommodation cavity, communicates with the first cooling channel, the second cooling channel, and the third cooling channel, and may guide, in a direction from the first cooling channel to the second cooling channel and then to the third cooling channel, coolant oil flowing out of an oil inlet.

In the stator, three layers of cooling channels are disposed in the stator. After being guided to an accommodation space from the oil inlet, the coolant oil may flow in the direction from the first cooling channel to the second cooling channel and then to the third cooling channel. In a process in which the coolant oil flows in the direction, the coolant oil first flows through the first cooling channel between the iron core punching sheet and the housing, and the coolant oil in the first cooling channel preliminarily cools the stator. Then, the coolant oil enters the second cooling channel, and the coolant oil in the second cooling channel cools the stator again. Finally, the coolant oil enters the third cooling channel, and the coolant oil in the third cooling channel cools the stator for a third time. It should be noted that the three-layer oil-injection cooling design can increase a contact area between the coolant oil and the stator, to improve a heat dissipation capability of the stator, so as to meet a cooling requirement, in a low-speed and high-torque working condition and a high-rotation-speed working condition, of a motor to which the stator is applied.

When a position of the oil inlet on the housing is set, it may be set that in an extension direction of the housing, the oil inlet is located on a side part of the housing, and the oil inlet is located between end faces on two sides of the iron core punching sheet. It should be understood that after the coolant oil enters the accommodation cavity, the coolant oil may flow from the position of the oil inlet to two sides along the first cooling channel. That is, after a winding is installed, coolant oil on one side of the winding has two flow directions, to improve a cooling effect.

When a structure of the first cooling channel is set, it may be set that the first cooling channel includes the housing and/or the iron core punching sheet. For example, in a possible implementation, the first cooling channel includes a hole disposed on a side wall of the housing. In another possible implementation, the first cooling channel includes a hole formed through fitting between a side wall of the housing and the iron core punching sheet. In another possible implementation, the first cooling channel includes a hole on the iron core punching sheet.

When the first cooling channel includes only the iron core punching sheet, it may be set that the first cooling channel includes a plurality of first oil guiding slots disposed on the outer edge of the yoke part, and each first oil guiding slot penetrates through the iron core punching sheet in an extension direction of the iron core punching sheet. For example, each first oil guiding slot corresponds to one stator slot, so that the first oil guiding slot has a better cooling effect. Further, it may be set based on a requirement that the first oil guiding slot does not correspond to the stator slot. Details are not described herein.

When a structure of the second cooling channel is set, it may be set that the second cooling channel includes a plurality of second oil guiding slots disposed on the inner edge of the yoke part, and each second oil guiding slot penetrates through the iron core punching sheet in the extension direction of the iron core punching sheet. Each second oil guiding slot corresponds to one stator slot, so that the second oil guiding slot has a better cooling effect. It should be understood that each second oil guiding slot is disposed at a position that avoids the tooth part, to ensure electromagnetic performance of the stator.

When structures of the first oil guiding slot and the second oil guiding slot are set, it may be set that the first oil guiding slot and/or the second oil guiding slot are/is an open slot or a through hole formed on the yoke part. For example, each first oil guiding slot may be an open slot whose opening is located on an outer surface of the yoke part or a through hole formed on the yoke part, and each second oil guiding slot may be an open slot whose opening is located on an inner surface of the yoke part or a through hole formed on the yoke part. It should be understood that different structures are set for the iron core punching sheet and the flow guiding assembly, to correspond to different structures of the first oil guiding slot and the second oil guiding slot. For example, there are at least the following several disposing forms.

In a first possible implementation, each first oil guiding slot is a through hole formed on the yoke part, that is, each first oil guiding slot forms an independent oil guiding path; and each second oil guiding slot may be an open slot whose opening is located on the inner surface of the yoke part, and a winding wound in the stator slot is in direct contact with the coolant oil, to implement a better cooling effect. In addition, the iron core punching sheet includes two iron core punching sub-sheets, and the flow guiding assembly includes two end plates and a ring-shaped intermediate flow guiding member. For example, the intermediate flow guiding member is made of a same material as the iron core punching sheet. In other words, the intermediate flow guiding member is an iron core punching sheet in another shape.

In an example, in the stator provided in the embodiments, the two end plates are disposed opposite to each other, each end plate abuts against one end of the iron core punching sheet, a flow guiding slot is disposed on a side that is of each end plate and that faces the iron core punching sheet, and the flow guiding slot communicates with the first cooling channel and the second cooling channel, to guide the coolant oil from the first cooling channel to the second cooling channel. The intermediate flow guiding member abuts between the two iron core punching sub-sheets, and corresponds to the position of the oil inlet. It should be noted that an outer edge of the ring-shaped intermediate flow guiding member cannot block the first cooling channel, so that the coolant oil can enter the first cooling channel from the oil inlet, and an inner edge of the intermediate flow guiding member cannot block the second cooling channel, so that the coolant oil can be guided to the third cooling channel from the second cooling channel. For example, to improve a flow guiding effect, it may be set that the outer edge of the intermediate flow guiding member does not go beyond a slot bottom of the first oil guiding slot, and the inner edge of the intermediate flow guiding member does not go beyond an outer edge of the second oil guiding slot.

In a second possible implementation, each first oil guiding slot and each second oil guiding slot are through holes formed on the yoke part, that is, each first oil guiding slot and each second oil guiding slot form an independent oil guiding path. It should be understood that each second oil guiding slot forms an independent oil guiding channel, and therefore the coolant oil is not in direct contact with a winding wound in the stator slot, and a coil in the winding is prevented from entering the cooling channel in a process. In this way, the process is simpler, and implementation costs are lower. It should be noted that another structure in the second possible implementation is the same as the structure in the first possible implementation.

In a third possible implementation, each first oil guiding slot is an open slot whose opening is located on the outer surface of the yoke part, and the coolant oil may enter the first cooling channel through openings of some first oil guiding slots, to increase a speed at which the coolant oil enters the first cooling channel. In addition, each second oil guiding slot is a through hole formed on the yoke part, and the coolant oil is not in direct contact with a winding wound in the stator slot, and a coil is prevented from entering the cooling channel in a process. In this way, the process is simpler, and implementation costs are lower. It should be noted that another structure in the third possible implementation is the same as the structure in the first possible implementation and the structure in the second possible implementation.

In a fourth possible implementation, each first oil guiding slot is an open slot whose opening is located on the outer surface of the yoke part, and the coolant oil may enter the first cooling channel through openings of some first flow guiding slots, to increase a speed at which the coolant oil enters the first cooling channel. In addition, each second oil guiding slot is an open slot whose opening is located on the inner surface of the yoke part, and a winding wound in the stator slot is in direct contact with the coolant oil, to implement a better cooling effect.

In a fifth possible implementation, each first oil guiding slot is an open slot whose opening is located on the outer surface of the yoke part, and each second oil guiding slot is an open slot whose opening is located on the inner surface of the yoke part. The flow guiding assembly includes a first end plate and a second end plate that are disposed opposite to each other, and each of the first end plate and the second end plate abuts against one side of the iron core punching sheet. It should be noted that in the fourth possible implementation, only one type of iron core punching sheet needs to be disposed in the stator, and a structure design is simpler.

For example, each end plate includes a ring-shaped main body part and a plurality of extension parts. The main body part corresponds to the yoke part of the iron core punching sheet, and a plurality of abutting blocks are disposed on a side that is of the main body part and that faces the iron core punching sheet. The plurality of abutting blocks is evenly distributed on an outer side of the main body part in the circumferential direction, to form a flow guiding space between the end plate and the iron core punching sheet. It should be noted that each abutting block abuts against a part that is of the iron core punching sheet and that is located between adjacent first oil guiding slots. Therefore, the coolant oil can be smoothly guided from the first cooling channel to the flow guiding space formed between each end plate and the iron core punching sheet. The plurality of extension parts is evenly distributed on an inner side of the main body part in the circumferential direction. There is a notch between adjacent extension parts, and a plurality of notches are formed by using the plurality of extension parts. Each of the plurality of notches corresponds to one stator slot, and the plurality of notches include a first notch and a second notch that are alternately arranged in the circumferential direction.

In addition, a separation structure is further disposed on a side that is of each end plate and that faces the iron core punching sheet. The separation structure surrounds the first notch, to separate the flow guiding space into a first flow guiding space and a second flow guiding space. The first notch is located in the second flow guiding space. The first flow guiding space corresponds to the first cooling channel, and the second flow guiding space corresponds to the second cooling channel. It should be noted that there is a specific angle between the first end plate and the second end plate on two sides of the iron core punching sheet in the circumferential direction, and in the extension direction of the iron core punching sheet, the first flow guiding space in each of the first end plate and the second end plate communicates with a second flow guiding space in the other end plate through the second flow guiding slot.

For example, the coolant oil flowing out of the first cooling channel may enter the first flow guiding space separated by the separation structure. Then, the coolant oil may enter, from the first flow guiding space on the side, the second cooling channel that communicates with the first flow guiding space. After the coolant oil flows from one end of the second cooling channel to the other end, the coolant oil may flow to the second flow guiding space between the end plate on the other side and the iron core punching sheet. Then, the coolant oil flows in the second flow guiding space. When the coolant oil flows in the second flow guiding space, the coolant oil may flow in an extension direction of the extension part.

It should be noted that each of the first notch and the second notch corresponds to one stator slot, and each second flow guiding space surrounds one first notch. Therefore, when the coolant oil flows in the second flow guiding space, the coolant oil may reach the third cooling channel formed through fitting between the slot opening of the stator slot between the adjacent tooth parts and the spacer sleeve. Then, the coolant oil flows to two sides along the third cooling channel. The three-layer oil-injection cooling design can increase a contact area between the coolant oil and the stator, to improve a heat dissipation capability of the stator, so as to meet a cooling requirement, in a low-speed and high-torque working condition and a high-rotation-speed working condition, of a motor to which the stator is applied.

When the separation structure is disposed, a plurality of separation structures may be formed. For example, there are at least the following several separation structures.

Manner 1: It may be set that the separation structure includes a first separation substructure and a second separation substructure.

The first separation substructure is connected to an end that is of extension parts on two sides of the first notch and that faces away from the main body part, the first separation substructure is partially located on the main body part, and there is a spacing between a part that is of the first separation substructure and that is located on the main body part and an inner edge of the main body part, to form an independent second flow guiding space.

The second separation substructure is disposed on the inner edge of the main body part, and is connected to the adjacent first separation substructure, to form the first flow guiding space between an outer edge of the main body part and each of the first separation substructure and the second separation substructure.

Manner 2: The separation structure includes a first separation substructure. The first separation substructure is connected to an end that is of extension parts on two sides of the first notch and that faces away from the main body part, and the first separation substructure is partially located on the main body part, to form an independent second flow guiding space.

To fasten the spacer sleeve, a fastening assembly may be further disposed. For example, the disposed fastening assembly includes two fasteners disposed opposite to each other, each fastener corresponds to one end plate, and each fastener is disposed on a side that is of the end plate corresponding to the fastener and that faces away from the other end plate. For example, an inner ring of each fastener is disposed on a barrier block configured to prevent the spacer sleeve from moving in an extension direction.

According to a second aspect, an embodiment further provides a motor. The motor includes a rotor and any stator provided in the solution in the first aspect. It should be understood that the rotor fits with the stator to perform a function.

In the motor provided in the embodiments, three layers of cooling channels are disposed in the stator. After being guided to an accommodation space from an oil inlet, coolant oil may flow in a direction from a first cooling channel to a second cooling channel and then to a third cooling channel. In a process in which the coolant oil flows in the direction, the coolant oil first flows through the first cooling channel on an outer surface of an iron core punching sheet, and the coolant oil in the first cooling channel preliminarily cools the stator. Then, the coolant oil enters the second cooling channel, and the coolant oil in the second cooling channel cools the stator again. Finally, the coolant oil enters the third cooling channel, and the coolant oil in the third cooling channel cools the stator for a third time. It should be noted that the three-layer oil-injection cooling design can increase a contact area between the coolant oil and the stator, to improve a heat dissipation capability of the stator provided in the embodiments, so as to meet a cooling requirement, in a low-speed and high-torque working condition and a high-rotation-speed working condition, of the motor to which the stator is applied.

According to a third aspect, the embodiments further provide an electric vehicle, and any motor provided in the solution in the second aspect is installed in the electric vehicle. The motor in the electric vehicle is in line with a trend of a high speed and miniaturization of the motor.

DETAILED DESCRIPTION OF EMBODIMENTS

Figure 1:
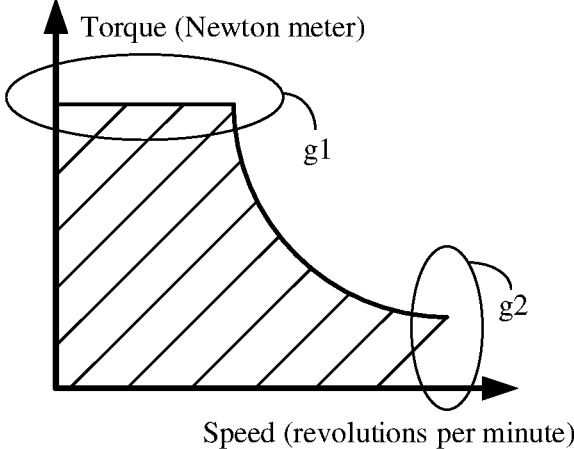
FIG. 1 is a diagram of a relationship between a rotation speed and torque of a motor.

To facilitate understanding of the stator provided in embodiments, an application scenario of the stator is first described. The stator provided in embodiments may be applied to a motor in an electric vehicle. The motor is used as a core of a power output of the electric vehicle, and a key point in design of the motor is to ensure normal and stable running. In the design of the motor, a heat loss of the motor should be considered. For example, the heat loss of the motor includes a coil loss, an iron core loss, a frictional loss, a stray loss, and a mechanical loss. The coil loss is caused due to heat generation caused by ohmic resistance and a skin effect, and the iron core loss can come from an eddy current loss. FIG. 1 is a diagram of a relationship between a rotation speed and torque of a motor. In FIG. 1, g1 represents the coil loss, and g2 represents the iron core loss. Thus, the coil loss increases with the torque, and the iron core loss increases with the rotation speed.

With development of electric vehicles, there is an increasing requirement for a high speed and miniaturization of the motor. To maintain same power as an existing powertrain, a maximum rotation speed and current density of the motor need to be further increased. With reference to FIG. 1, it can be understood that an increase of the maximum rotation speed results in an increase of the iron core loss in the stator, and an increase of the current density results in a great increase of the coil loss. This means that there is a risk of overtemperature in a coil in a low-speed and high-torque working condition, and an increase of the iron core loss in the stator at a high speed results in a risk of overtemperature in the middle of the coil. Therefore, it is important to design a cooling structure of the stator in the motor.

Figure 2:
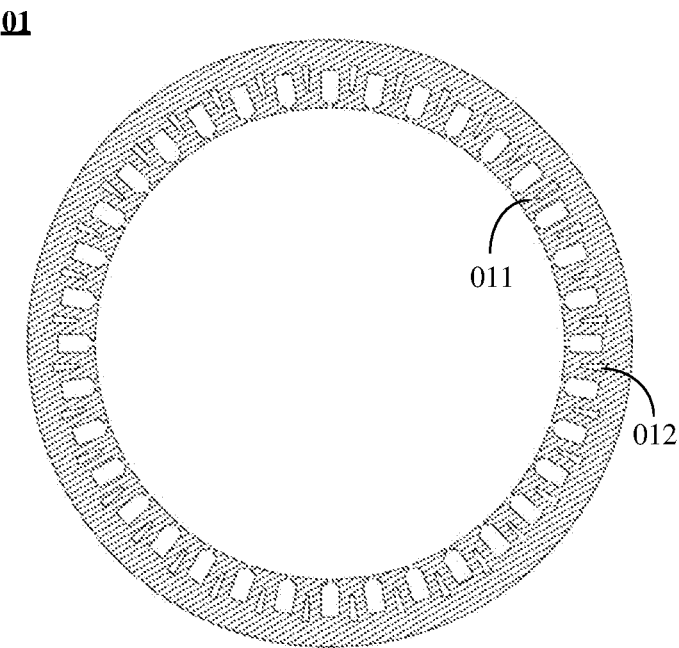
FIG. 2 is a diagram of a structure of an iron core punching sheet in a stator in the conventional technology.

FIG. 2 is a diagram of a structure of an iron core punching sheet 01 in a stator in the conventional technology. In the structure shown in FIG. 2, an oil guiding slot 012 is disposed at a position, on the iron core punching sheet 01, corresponding to each tooth part 011. Coolant oil is input to the oil guiding slot 012, to cool the iron core punching sheet 01.

However, in this structure, there is only one layer of cooling channel design, and a cooling capability is insufficient, and consequently it is difficult to cope with increasingly high power density of a motor. In addition, electromagnetic performance of the stator is affected because the oil guiding slot 012 is disposed in the middle of the tooth part 011.

Figure 3:
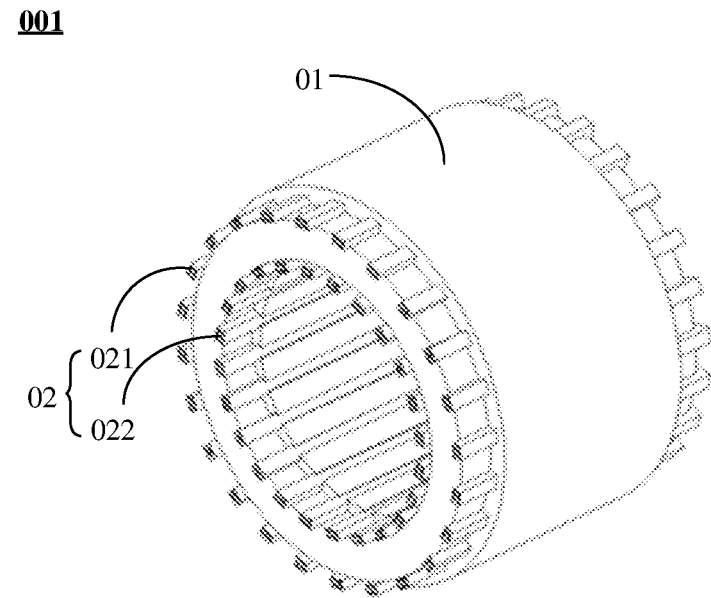
FIG. 3 is a diagram of a structure of another stator in the conventional technology.

FIG. 3 is a diagram of a structure of another stator 001 in the conventional technology. In the structure shown in FIG. 3, the stator 001 includes an iron core punching sheet 01 and a cooling pipe 02, and the cooling pipe 02 includes a first side pipe 021 and a second side pipe 022. It should be noted that the first side pipe 021 and the second side pipe 022 penetrate through the iron core punching sheet 01, to cool the iron core punching sheet 01.

Figure 4:
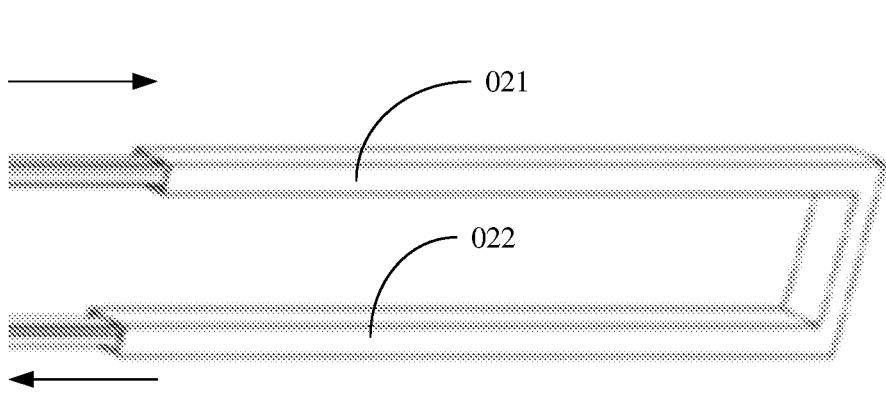
FIG. 4 is an enlarged schematic diagram of a cooling pipe in FIG. 3.

FIG. 4 is an enlarged schematic diagram of the cooling pipe 02 in FIG. 3. With reference to FIG. 4, referring to the structure in FIG. 3, it can be understood that double-layer cooling of the structure of the stator 001 is implemented by using the cooling pipe 02 in the structure of the stator shown in FIG. 3, but it is still difficult to cope with increasingly high power density of a motor, and in the cooling manner, a structure is complex, resulting in a complex manufacturing process and high costs.

Based on this, embodiments provide a stator, to provide a stator with a high heat dissipation capability to meet an increasingly high power density requirement of a motor.

Terms used in the following embodiments are intended to describe specific embodiments, but are not intended to limit the embodiments. The terms "one", "a", "the", and "this" of singular forms are also intended to include expressions such as "one or more", unless otherwise specified in the context clearly. The terms "include", "comprise", "have", and variants thereof mean "include but is not limited to", unless otherwise specifically emphasized in another manner.

The following clearly describes the solutions in embodiments with reference to the accompanying drawings.

Figure 5:
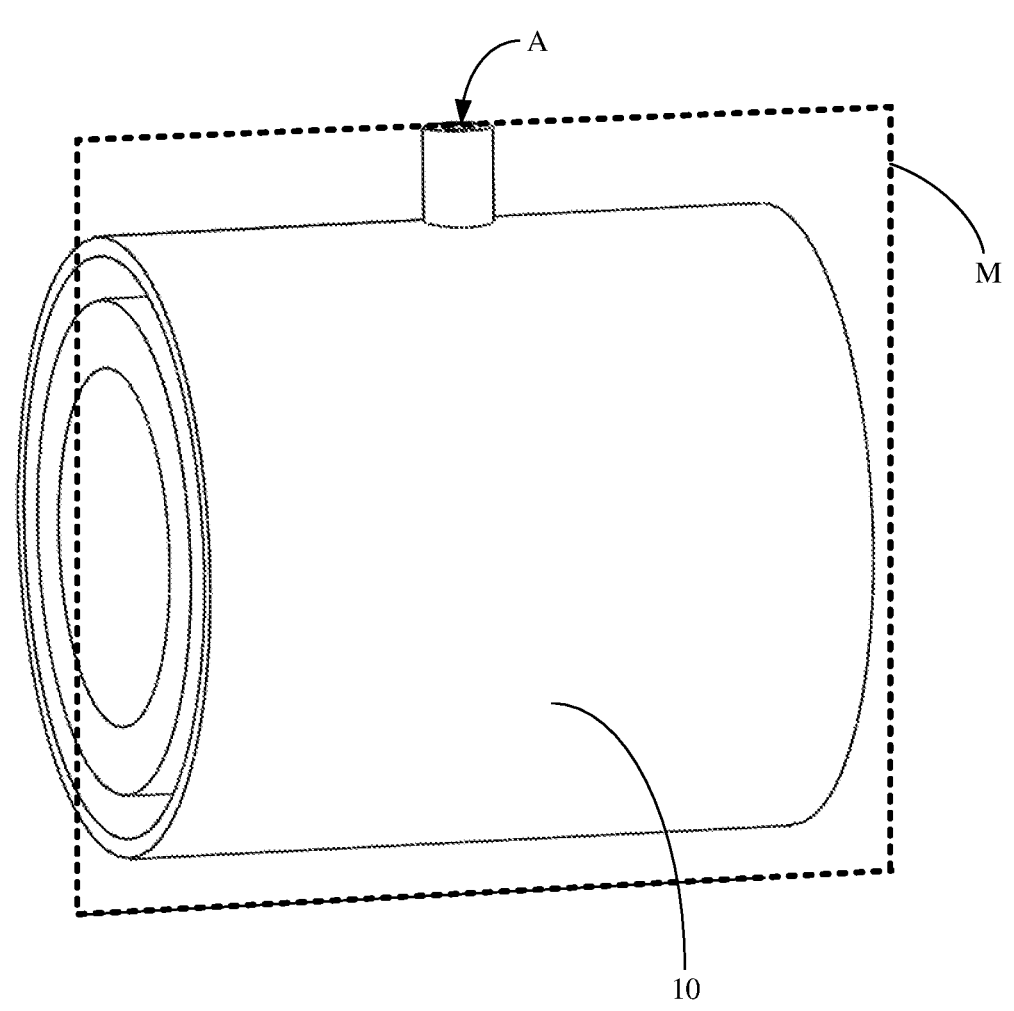
FIG. 5 is a schematic diagram of a structure of a stator according to an embodiment.
Figure 6:
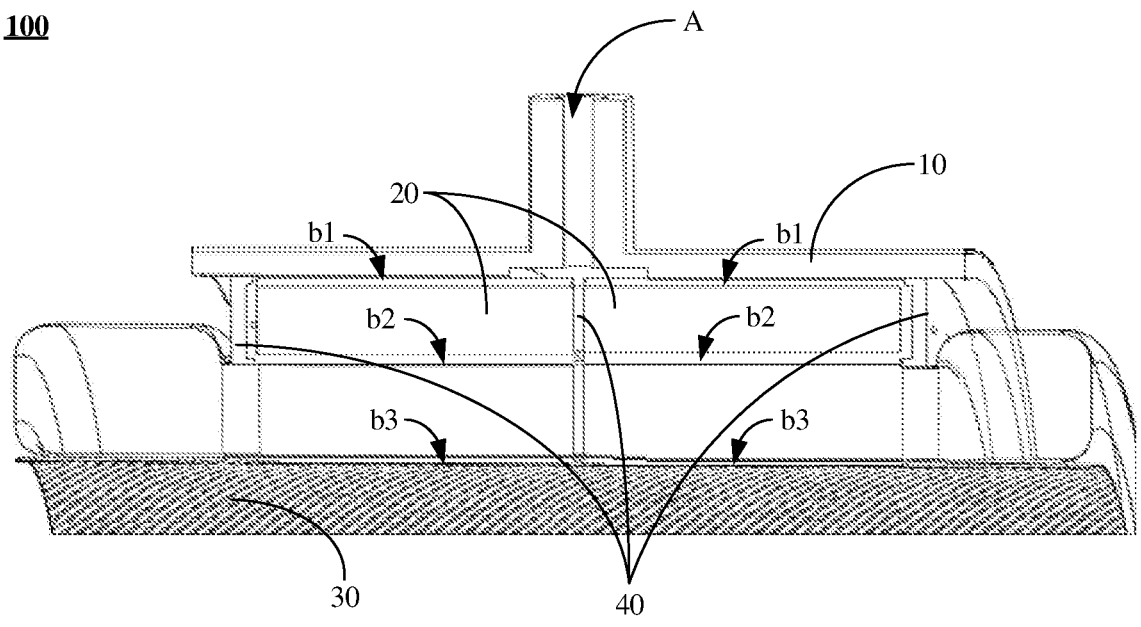
FIG. 6 is a sectional view on a plane M in FIG. 5.

FIG. 5 is a schematic diagram of a structure of a stator 100 according to an embodiment. FIG. 6 is a sectional view on a plane M in FIG. 5. With reference to FIG. 5, referring to the structure shown in FIG. 6, in the stator 100 provided in this embodiment, a housing 10 has an accommodation cavity, and an oil inlet A is disposed on the housing 10. At the oil inlet A, coolant oil may be input from outside to the accommodation cavity, to cool the stator 100 provided in this embodiment.

Still referring to the structure shown in FIG. 6, an iron core punching sheet 20 for implementing an electromagnetic function of the stator 100, a spacer sleeve 30 sleeved in the iron core punching sheet 20, and a flow guiding assembly 40 that performs a flow guiding function are installed in the accommodation cavity. For example, the iron core punching sheet 20 abuts against an inner wall of the housing 10. For example, a structure of the iron core punching sheet 20 is a ring-shaped structure shown in FIG. 7, and the iron core punching sheet 20 includes a yoke part 21 and a plurality of tooth parts 22. The plurality of tooth parts 22 are evenly distributed on an inner side of the yoke part 21 in a circumferential direction, and a stator slot C is disposed between adjacent tooth parts 22. Further, a winding that includes a coil is wound in the stator slot C. It should be understood that to clearly show a position relationship among the iron core punching sheet 20, the spacer sleeve 30, and the flow guiding assembly 40, the winding is not shown herein.

Figure 7:
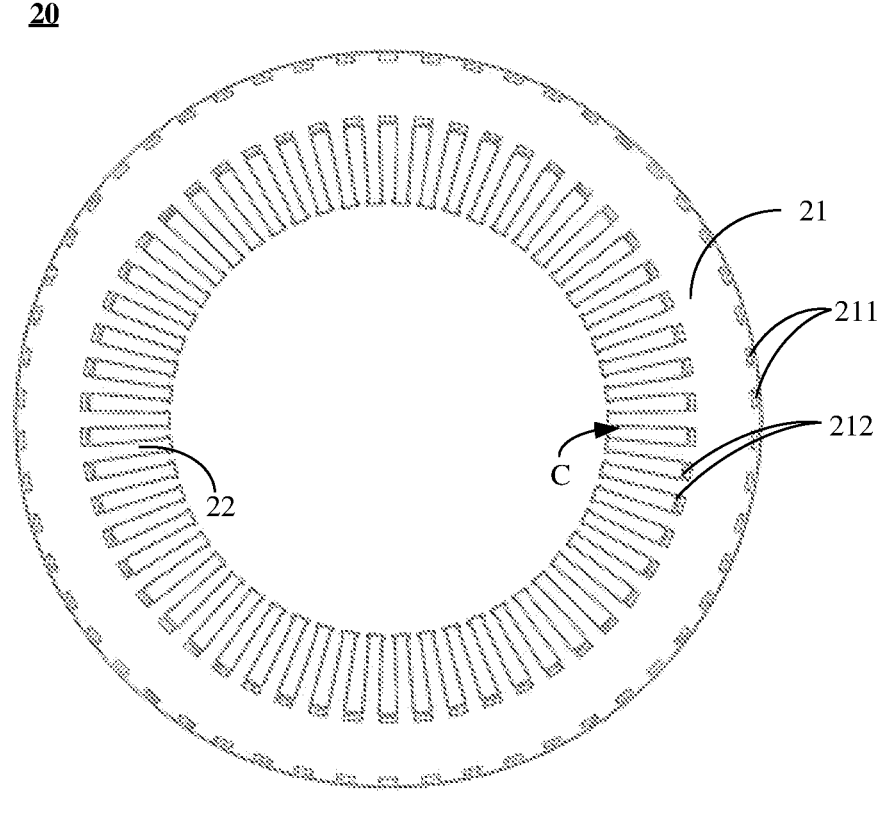
FIG. 7 is a diagram of a structure of an iron core punching sheet according to an embodiment.

With reference to FIG. 7, referring to the structure shown in FIG. 6, a first cooling channel b1 is disposed between an outer edge of the yoke part 21 of the iron core punching sheet 20 and the housing 10, and the first cooling channel b1 communicates with the oil inlet A. When the coolant oil flows in the first cooling channel b1, the coolant oil may cool an outer surface of the iron core punching sheet 20. A second cooling channel b2 is disposed on an inner edge of the yoke part 21 of the iron core punching sheet 20. When the coolant oil flows in the second cooling channel b2, the coolant oil may cool a root of the stator slot C. A slot opening of the stator slot C fits with the spacer sleeve 30 to form a third cooling channel b3 shown in FIG. 6. When the coolant oil flows in the third cooling channel b3, the coolant oil cools a slot opening position of the stator slot C. It should be noted that the three-layer oil-injection cooling design can increase a contact area between the coolant oil and the stator 100, to improve a heat dissipation capability of the stator 100 provided in the embodiments.

Figure 8:
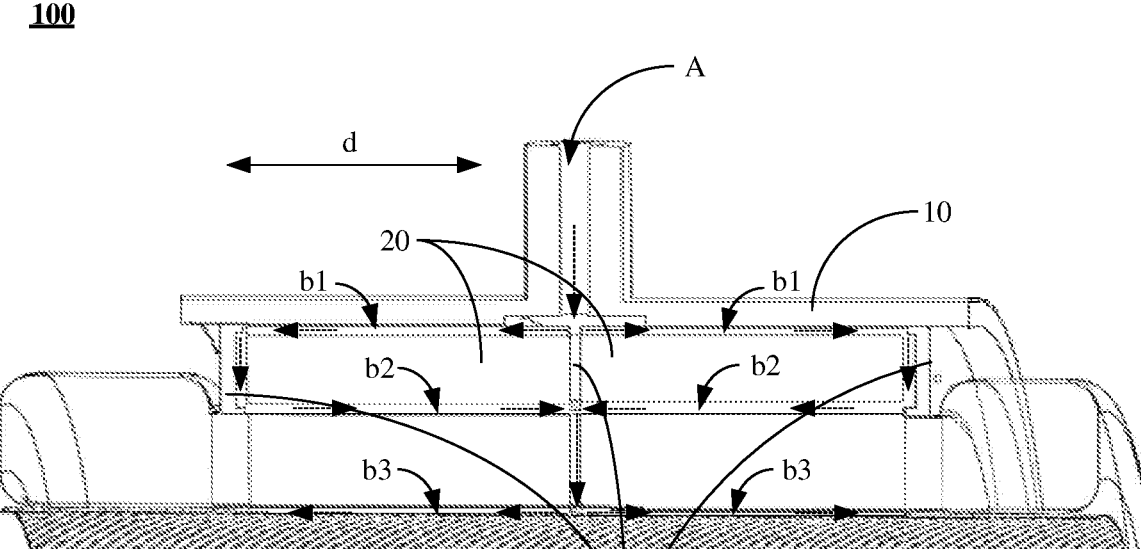
FIG. 8 is a schematic diagram of flow of coolant oil in a stator shown in FIG. 6.

FIG. 8 is a schematic diagram of flow of coolant oil in the stator 100 shown in FIG. 6. When the stator 100 provided in this embodiment is applied, a flow direction of the coolant oil in the stator 100 is shown by an arrow direction in FIG. 8. In a structure shown in FIG. 8, after the coolant oil is guided to an accommodation space from the oil inlet A, the flow guiding assembly 40 guides the coolant oil to flow in a direction from the first cooling channel b1 to the second cooling channel b2 and then to the third cooling channel b3. In a process in which the coolant oil flows in the direction, the coolant oil first flows through the first cooling channel b1 on the outer surface of the iron core punching sheet 20, and the coolant oil in the first cooling channel b1 preliminarily cools the stator 100. Then, the coolant oil enters the second cooling channel b2, and the coolant oil in the second cooling channel b2 cools the stator 100 again. Finally, the coolant oil enters the third cooling channel b3, and the coolant oil in the third cooling channel b3 cools the stator 100 for a third time.

It should be noted that when a structure of the first cooling channel b1 is set, it may be set that the first cooling channel b1 includes the housing 10 and/or the iron core punching sheet 20. For example, in a possible implementation, the first cooling channel b1 includes a hole disposed on a side wall of the housing 10. In another possible implementation, the first cooling channel b1 includes a hole formed through fitting between a side wall of the housing 10 and the iron core punching sheet 20. In another possible implementation, the first cooling channel b1 includes a hole on the iron core punching sheet 20.

When the first cooling channel b1 includes only the iron core punching sheet 20, the first cooling channel b1 shown in FIG. 6 may include a plurality of first oil guiding slots 211 disposed on the outer edge of the yoke part 21 shown in FIG. 7. Similarly, the second cooling channel b2 shown in FIG. 6 may include a plurality of second oil guiding slots 212 disposed on the inner edge of the yoke part 21 shown in FIG. 7. For example, each first oil guiding slot 211 penetrates through the iron core punching sheet 20 in an extension direction of the iron core punching sheet 20, and each second oil guiding slot 212 penetrates through the iron core punching sheet 20 in the extension direction of the iron core punching sheet 20.

In consideration of a winding position of the winding, when a position of the first oil guiding slot 211 is set, it may be set that each first oil guiding slot 211 corresponds to one stator slot C, so that the first oil guiding slot 211 better cools the stator 100. Similarly, it may be set that each second oil guiding slot 212 corresponds to one stator slot C, so that the second oil guiding slot 212 better cools the stator 100 and the winding. It should be noted that the second oil guiding slot 212 is disposed between adjacent tooth parts 22, and avoids a root region of the tooth part 22, to ensure electromagnetic performance of the stator 100.

Additionally, when the position of the first oil guiding slot 211 is set, there may be no correspondence between the first oil guiding slot 211 and the stator slot C. This is not limited herein. In addition, shapes of the first oil guiding slot 211 and the second oil guiding slot 212 are not limited to the structure shown in FIG. 7, and may be changed based on a use requirement. Details are not described herein.

It should be noted that still referring to the structure shown in FIG. 8, in an extension direction d of the stator 100, the oil inlet A is located between end faces on two sides of the iron core punching sheet 20. It should be understood that after the coolant oil enters the accommodation cavity, the coolant oil may flow from a position of the oil inlet A to two sides along the first cooling channel b1, to improve a cooling effect. Further, the position at which the oil inlet A is disposed may be offset in the direction d relative to a position in FIG. 8 based on a requirement. Details are not described herein.

It should be noted that when structures of the first oil guiding slot 211 and the second oil guiding slot 212 are set, it may be set that the first oil guiding slot 211 and/or the second oil guiding slot 212 are/is an open slot or a through hole. For example, each first oil guiding slot 211 may be an open slot whose opening is located on an outer surface of the yoke part 21, and/or each second oil guiding slot 212 may be an open slot whose opening is located on an inner surface of the yoke part 21. It should be understood that different structures are set for the iron core punching sheet 20 and the flow guiding assembly 40, to correspond to different structures of the first oil guiding slot 211 and the second oil guiding slot 212. For example, there are at least the following several implementations.

Implementation 1

Figure 9:
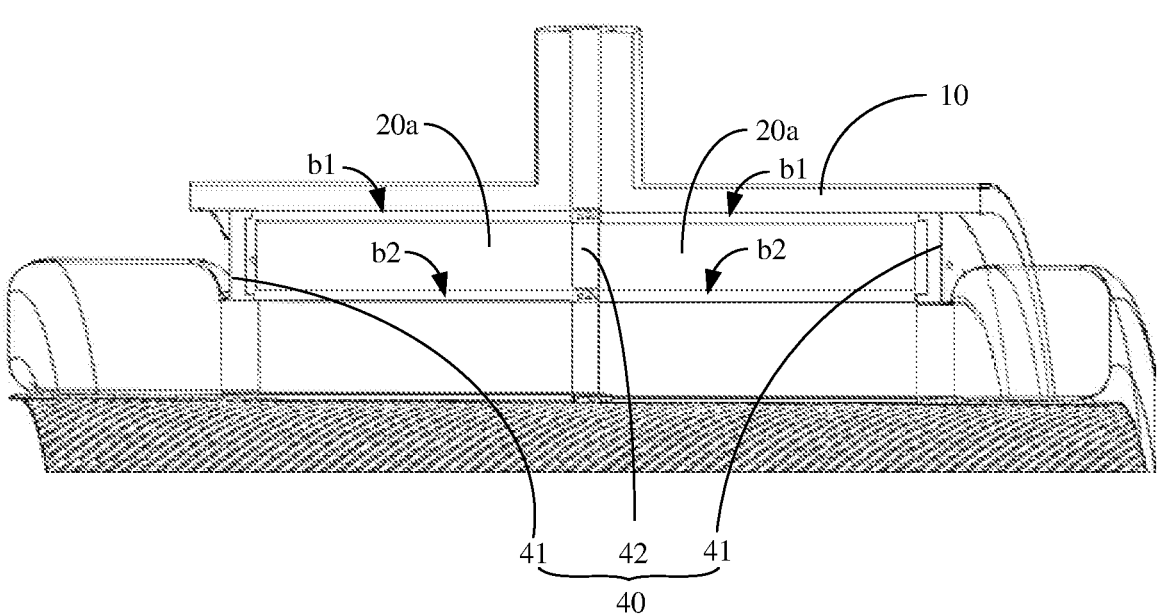
FIG. 9 is a sectional view of a stator according to an implementation 1.

FIG. 9 is a sectional view of the stator 100 according to the implementation 1. In a structure shown in FIG. 9, the iron core punching sheet is shown in a form of two iron core punching sub-sheets 20a. In other words, the iron core punching sheet in the implementation 1 includes two iron core punching sub-sheets 20a. Corresponding to structures of the two iron core punching sub-sheets 20a, the flow guiding assembly 40 includes two end plates 41 and an intermediate flow guiding member 42. The intermediate flow guiding member 42 abuts between the two iron core punching sub-sheets 20a.

As for positions at which the two end plates 41 are disposed, still referring to the structure shown in FIG. 9, the two end plates 41 are disposed opposite to each other, each end plate 41 abuts against an end that is of one iron core punching sub-sheet 20*a* and that faces away from the other iron core punching sub-sheet 20*a*, and a flow guiding slot (such as a concave slot at a cross section of the end plate 41 shown in FIG. 8) is disposed on a side that is of each end plate 41 and that faces the iron core punching sub-sheet 20*a* corresponding to the end plate 41. The flow guiding slot communicates with the first cooling channel b1 and the second cooling channel b2, to guide the coolant oil from the first cooling channel b1 to the second cooling channel b2. It should be noted that in a flow guiding process of the end plate 41, the flow guiding slot distributes the coolant oil, so that a part or all of the coolant oil flows to the second cooling path b2. An end plate 41 in FIG. 9 is used as an example. A small hole is formed on the end plate 41, and the small hole communicates with the flow guiding slot, to guide a part of the coolant oil in the flow guiding slot to a side that is of the end plate 41 and that faces away from the iron core punching sub-sheet 20*a*. The small hole on the end plate 41 may be disposed based on a requirement. Details are not described herein.

Figure 10:
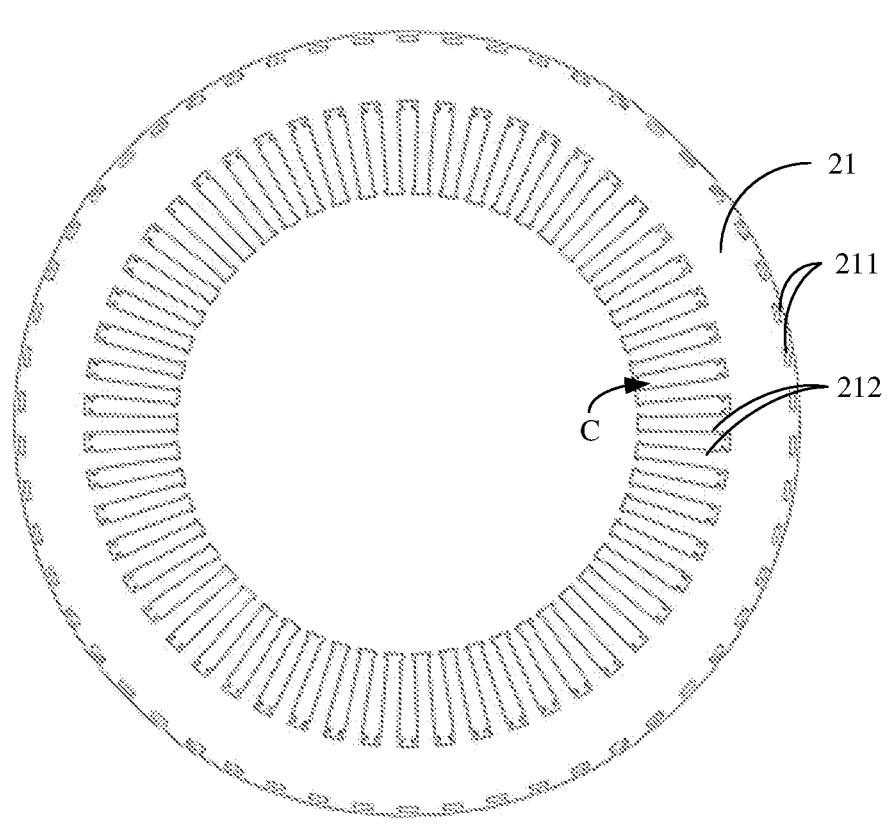
FIG. 10 is a schematic diagram of a structure of an iron core punching sub-sheet according to an implementation 1.

To clearly describe specific structures of the first cooling channel b1 and the second cooling channel b2, an iron core punching sub-sheet 20*a* shown in FIG. 10 is used as an example. In the structure shown in FIG. 9, each first oil guiding slot 211 disposed on the yoke part 21 is a through hole, and each first oil guiding slot 211 forms an independent oil guiding path. In addition, each second oil guiding slot 212 disposed on the yoke part 21 is an open slot whose opening is located on the inner surface of the yoke part 21. It should be understood that the second oil guiding slot 212 is an open slot, and therefore each second oil guiding slot 212 communicates with a stator slot C that is in a one-to-one correspondence with the second oil guiding slot 212. There-fore, a winding wound in the stator slot C is in direct contact with the coolant oil in the second oil guiding slot 212, to implement a better cooling effect.

Further, when the winding is disposed in the stator slot C, insulation paper is placed between the stator slot C and the winding. It should be understood that, that the winding is in direct contact with the coolant oil in the second oil guiding slot 212 herein means that the winding is separated from the coolant oil in the second oil guiding slot 212 by only one layer of insulation paper. The insulation paper is thin. Therefore, it may be considered that only thermal-convec-tion resistance exists between the coolant oil in the second oil guiding slot 212 and the winding, and therefore the coolant oil has a better cooling effect on the winding.

Figure 11:
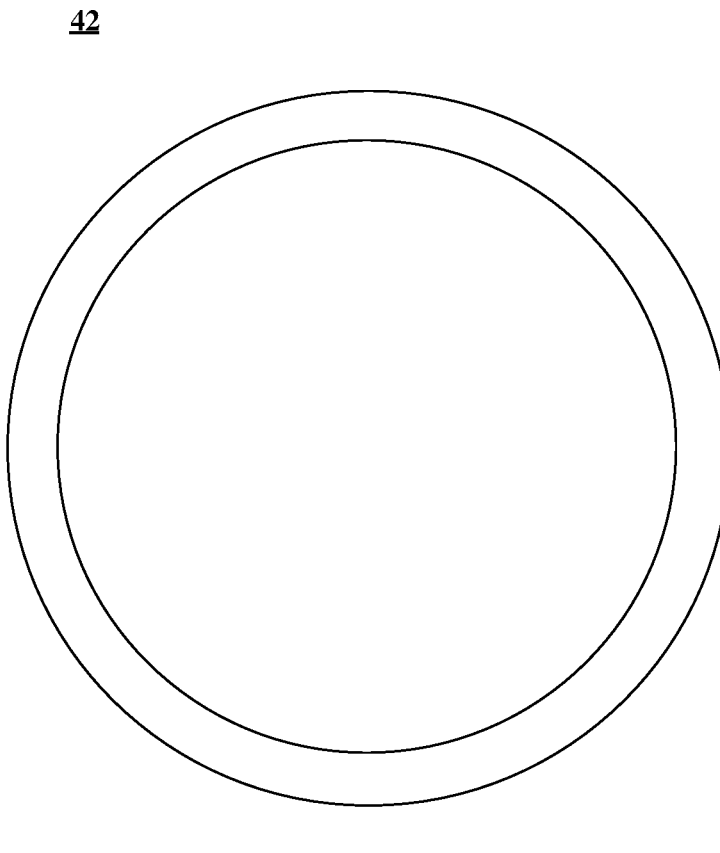
FIG. 11 is a schematic diagram of a structure of an intermediate flow guiding member according to an implementation 1.

FIG. 11 shows a specific structure of the intermediate flow guiding member 42. As shown in FIG. 11, the intermediate flow guiding member 42 is of a ring-shaped structure. For example, the intermediate flow guiding member 42 may be made of a same material as the iron core punching sub-sheet 20*a*. In other words, the intermediate flow guiding member 42 is an iron core punching sub-sheet 20*a* in another shape.

To describe a position of the intermediate flow guiding member 42 more clearly, with reference to FIG. 9 and FIG. 10, referring to the structure shown in FIG. 11, an outer edge of the intermediate flow guiding member 42 does not go beyond a slot bottom of the first oil guiding slot 211, to guide the coolant oil to the first cooling channel. In addition, an inner edge of the intermediate flow guiding member 42 does not go beyond an outer edge of the second oil guiding slot 212, to guide the coolant oil from the second cooling channel b2 to a gap between the two iron core punching sub-sheets 20*a*. Additionally, it may be set based on a requirement that the outer edge of the intermediate flow guiding member 42 partially blocks the first oil guiding slot 211, and/or the inner edge of the intermediate flow guiding member 42 partially blocks the second oil guiding slot 212. Details are not described herein.

Figure 12:
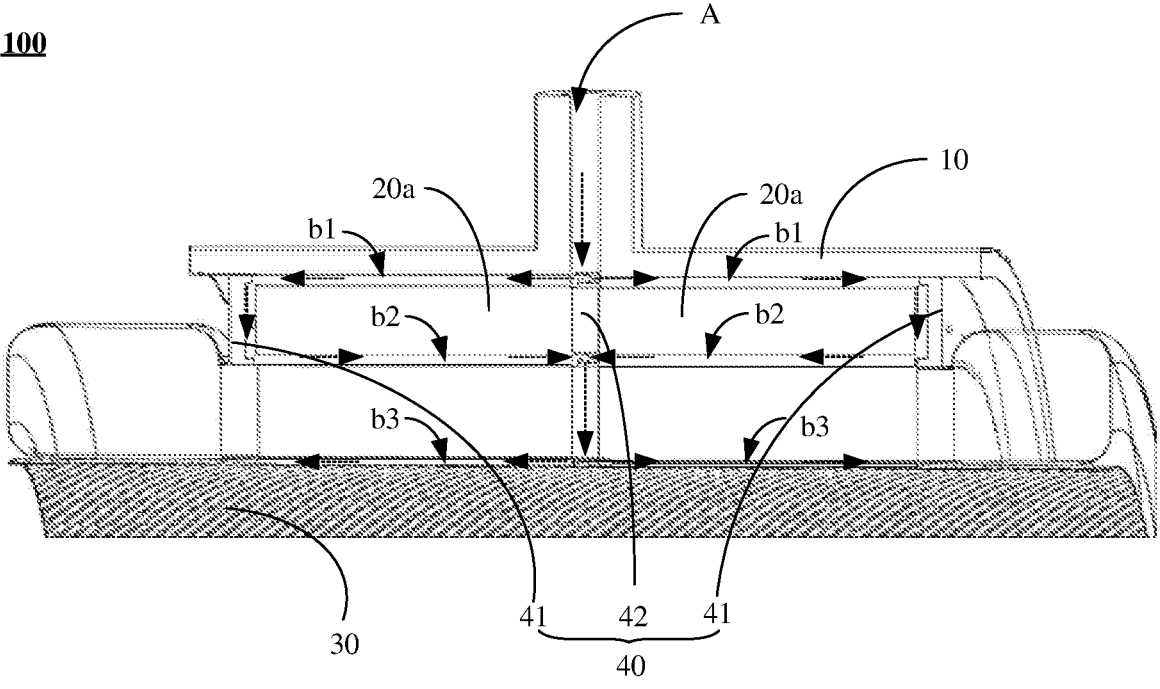
FIG. 12 is a schematic diagram of flow of coolant oil in a stator according to an implementation 1.

A specific flow manner of the coolant oil in the stator 100 is shown in FIG. 12. In a structure shown in FIG. 12, after flowing out of the oil inlet A, the coolant oil first reaches the housing 10, the outer edge of the intermediate flow guiding member 42, and a space formed between the two iron core punching sub-sheets 20*a*. Then, the coolant oil enters the first cooling channel b1 between the iron core punching sub-sheets 20*a* located on two sides of the intermediate flow guiding member 42. Then, the coolant oil flows along the first cooling channel b1 in a direction far away from the intermediate flow guiding member 42, until the coolant oil reaches the flow guiding slot formed between the end plate 41 and the iron core punching sub-sheet 20*a*. Then, the coolant oil enters, along the flow guiding slot, the second cooling channel b2 that communicates with the flow guiding slot. Then, the coolant oil flows along the second cooling channel b2 in a direction close to the intermediate flow guiding member 42, until the coolant oil flows from the second cooling channel b2 to the gap between the two iron core punching sub-sheets 20*a*. After the coolant oil enters the gap between the two iron core punching sub-sheets 20*a*, the coolant oil flows in a direction from an outer side to an inner side of the iron core punching sub-sheet 20*a*, until the coolant oil reaches the third cooling channel b3 formed through fitting between the spacer sleeve 30 and the iron core punching sub-sheet 20*a*. Then, the coolant oil flows along the third cooling channel b3 to two sides.

It can be understood from the foregoing flow process of the coolant oil that a three-layer oil-injection cooling design is provided in the stator 100 provided in this implementa-tion. The three-layer oil-injection cooling design can increase a contact area between the coolant oil and the stator 100, to improve a heat dissipation capability of the stator 100 provided in the embodiments.

Figure 13:
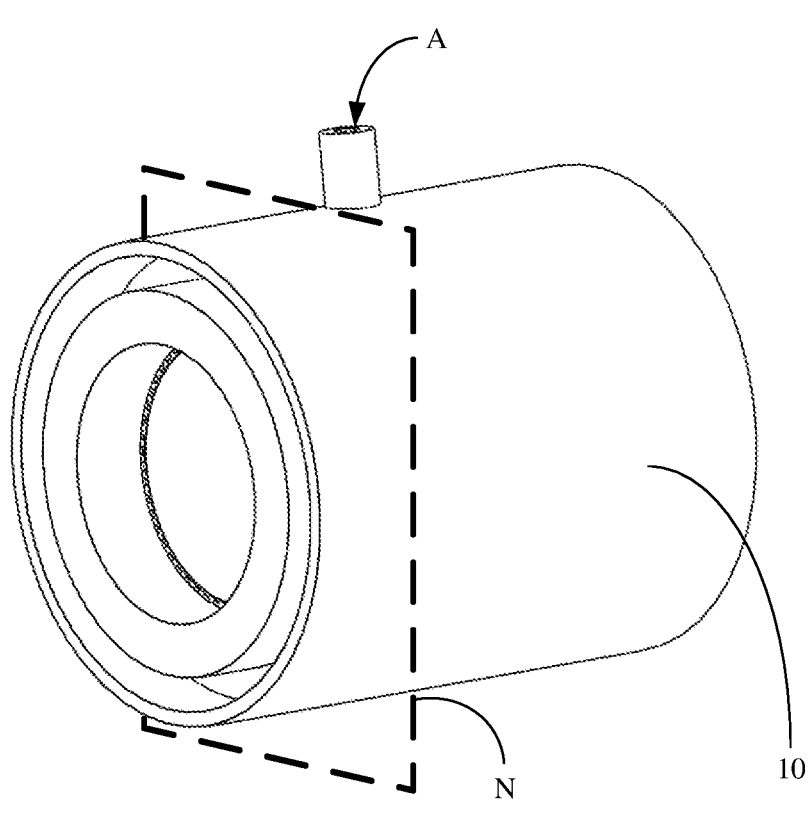
FIG. 13 is another schematic diagram of a structure of a stator according to an implementation.
Figure 14:
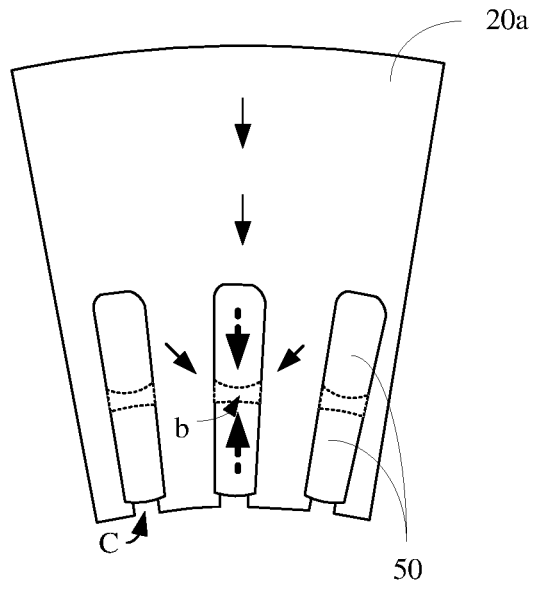
FIG. 14 is a first sectional view on a plane N in FIG. 13.

To further prove that the three-layer oil-injection cooling design can improve a cooling effect of the coolant oil on the stator 100 shown in FIG. 13, several comparison solutions are provided herein. FIG. 14, FIG. 15, FIG. 16, and FIG. 17 are all sectional views on a plane N in FIG. 13. FIG. 14 shows a structure in which coolant oil is injected only into the stator slot C. For example, in the structure shown in FIG. 14, two windings 50 are disposed in the stator slot C of the iron core punching sub-sheet 20*a*, and a cooling channel b is formed between the two windings 50. Heat in each winding 50 is transferred to the cooling channel b in a direction of a dashed line arrow in FIG. 14 for heat dissi-pation, and each part in the iron core punching sub-sheet 20*a* is transferred to the cooling channel in a direction of a solid line arrow in FIG. 14 for heat dissipation.

Figure 15:
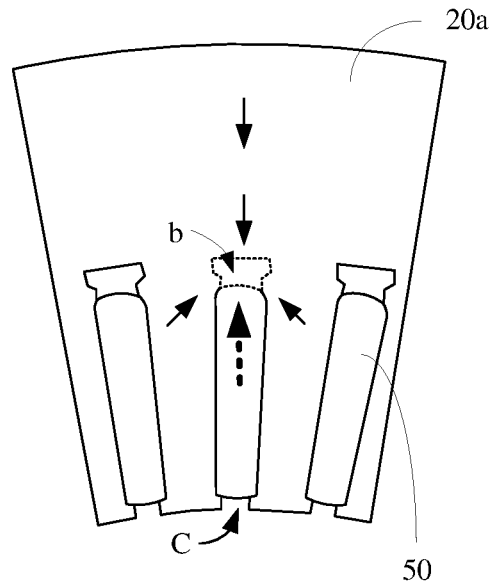
FIG. 15 is a second sectional view on a plane N in FIG. 13.

FIG. 15 shows a structure in which coolant oil is injected only into a bottom of the stator slot C. For example, in the structure shown in FIG. 15, a winding 50 is disposed in the stator slot C of the iron core punching sub-sheet 20*a*, and a cooling channel b is formed between the winding 50 and the iron core punching sub-sheet 20*a*. Heat in the winding 50 is transferred to the cooling channel b in a direction of a dashed line arrow in FIG. 15 for heat dissipation, and each part in the iron core punching sub-sheet 20*a* is transferred to the cooling channel in a direction of a solid line arrow in FIG. 15 for heat dissipation.

Figure 16:
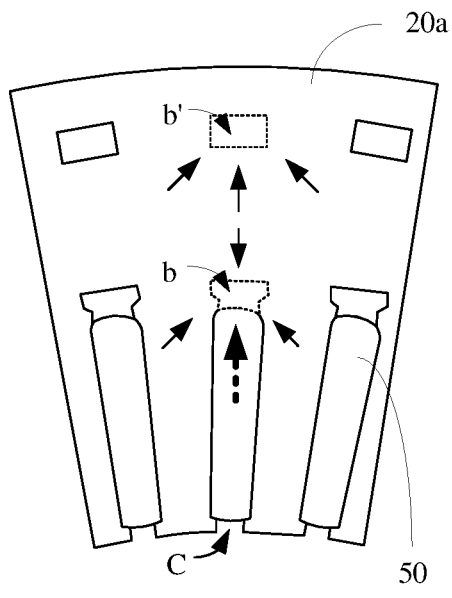
FIG. 16 is a third sectional view on a plane N in FIG. 13.

FIG. 16 shows a structure in which coolant oil is injected only into a bottom of the stator slot C and an outer edge of the iron core punching sub-sheet 20*a*. For example, in the structure shown in FIG. 16, a winding 50 is disposed in the stator slot C of the iron core punching sub-sheet 20a, a cooling channel b is formed between the winding 50 and the iron core punching sub-sheet 20a, and another cooling channel b' is formed on the outer edge of the iron core punching sub-sheet 20a. Heat in the winding 50 is transferred to the cooling channel b in a direction of a dashed line arrow in FIG. 16 for heat dissipation, and each part in the iron core punching sub-sheet 20a is transferred to the cooling channel in a direction of a solid line arrow in FIG. 16 for heat dissipation.

Figure 17:
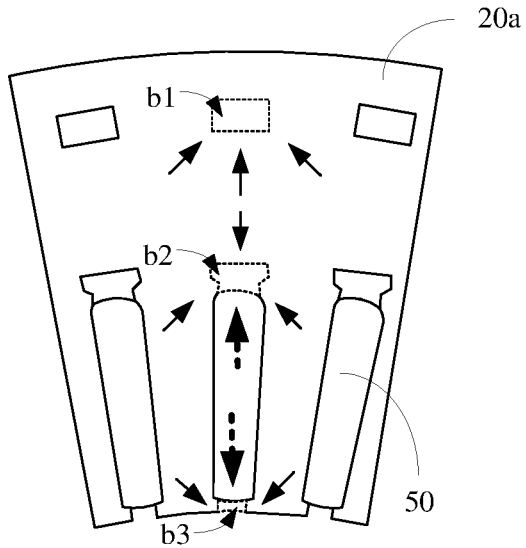
FIG. 17 is a fourth sectional view on a plane N in FIG. 13.

FIG. 17 shows a structure in which the three-layer oil-injection design in this implementation is used. For example, in the structure shown in FIG. 17, a first cooling channel b1, a second cooling channel b2, and a third cooling channel b3 are disposed on the iron core punching sub-sheet 20a. Heat in the winding 50 is transferred to each cooling channel in a direction of a dashed line arrow in FIG. 17 for heat dissipation, and each part in the iron core punching sub-sheet 20a is transferred to each cooling channel in a direction of a solid line arrow in FIG. 17 for heat dissipation. Compared with the structures shown in FIG. 14, FIG. 15, and FIG. 16, the three-layer oil-injection cooling design provided in this embodiment can increase a contact area between the coolant oil and the stator 100, to improve a heat dissipation capability of the stator 100 provided in the embodiments.

Implementation 2

Figure 18:
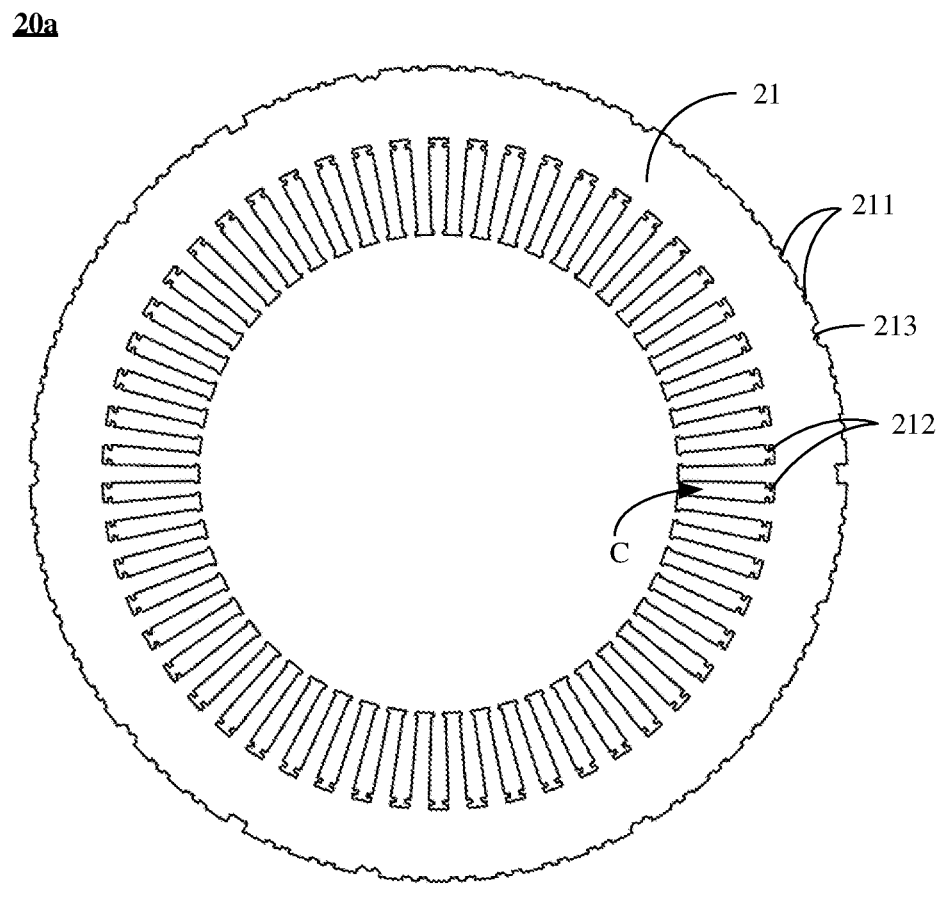
FIG. 18 is a schematic diagram of a structure of an iron core punching sub-sheet according to an implementation 2.

A main difference between a structure in the implementation 2 and the structure in the implementation 1 lies in a structure of the first oil guiding slot 211. FIG. 18 is a schematic diagram of a structure of an iron core punching sub-sheet 20a according to the implementation 2. In the structure shown in FIG. 18, each first oil guiding slot 211 is an open slot whose opening is located on the outer surface of the yoke part 21. It should be noted that many concave slots 213 in a shape different from that of the first oil guiding slot 211 are formed on the outer surface of the yoke part 21. The concave slot 213 is used as a welding slot during a welding operation, to connect a plurality of iron core punching sub-sheets 20a through welding.

Figure 19:
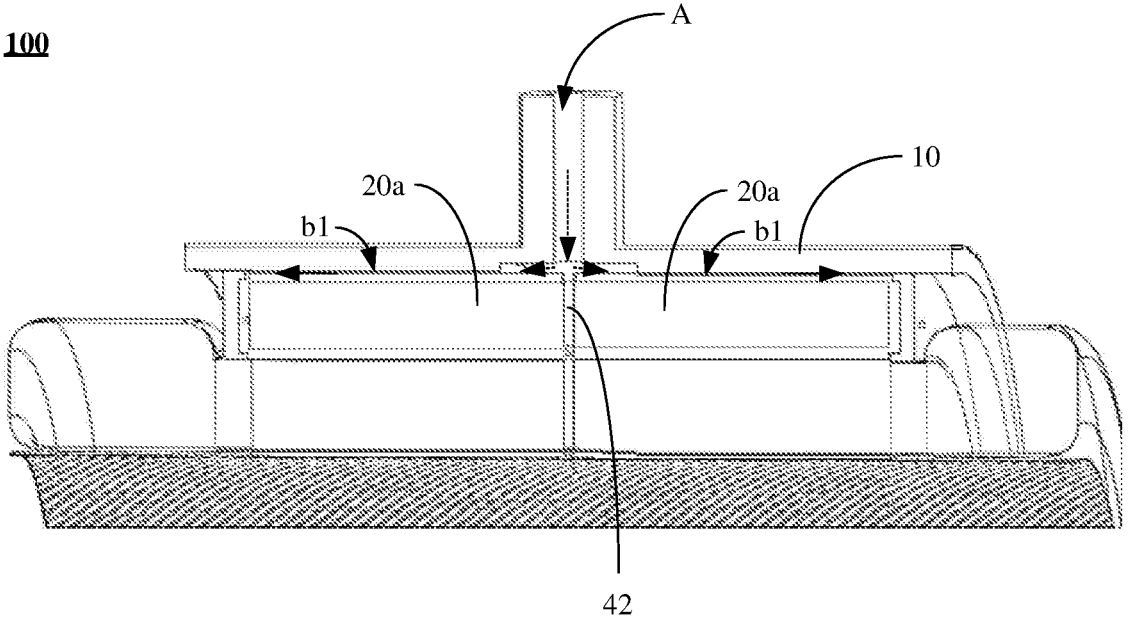
FIG. 19 is another schematic diagram of a structure of a stator according to an implementation 2.

Based on the structure of the first oil guiding slot 211, referring to a structure shown in FIG. 19, a structure of the housing 10 may be slightly deformed. In the structure shown in FIG. 19, a ring-shaped accommodation slot that faces the iron core punching sub-sheet 20a may be formed on a part that is of the housing 10 and that corresponds to the oil inlet A. After the coolant oil enters the accommodation cavity from the oil inlet A, the coolant oil may directly enter the first oil guiding slot 211 that communicates with the ring-shaped accommodation slot from the ring-shaped accommodation slot.

It should be noted that in this implementation, the ring-shaped accommodation slot fits with the first oil guiding slot 211 to accelerate a speed of distributing the coolant oil from the oil inlet A to the first cooling channel b1. In addition, the intermediate flow guiding member 42 in the implementation 2 may be thinner than the intermediate flow guiding member 42 in the implementation 1, to reduce manufacturing costs.

Implementation 3

Figure 20:
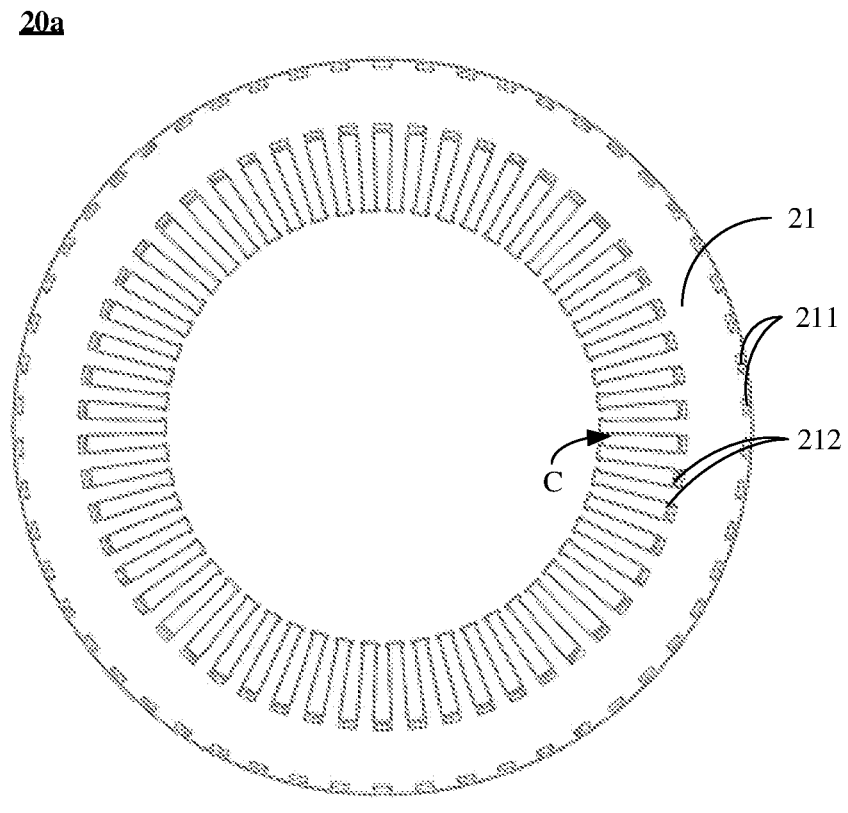
FIG. 20 is a schematic diagram of a structure of an iron core punching sub-sheet according to an implementation 3.

A main difference between a structure in the implementation 3 and the structure in the implementation 1 lies in a structure of the second oil guiding slot 212. FIG. 20 is a schematic diagram of a structure of an iron core punching sub-sheet 20a according to the implementation 3. In the structure shown in FIG. 20, each first oil guiding slot 211 and each second oil guiding slot 212 are through holes, that is, each first oil guiding slot 211 and each second oil guiding slot 212 form an independent oil guiding path.

It should be understood that each second oil guiding slot 212 forms an independent oil guiding channel, and therefore the coolant oil is not in direct contact with the winding wound in the stator slot C, and a coil in the winding can be prevented from entering the cooling channel in a process. In this way, not only the process can be simplified, but also costs can be reduced.

Implementation 4

A difference between a structure in the implementation 4 and the structure in the implementation 3 lies in that the first oil guiding slot 211 in the implementation 4 uses the structure in the implementation 2. For example, the first oil guiding slot 211 is an open slot whose opening is located on the outer surface of the yoke part 21, and each second oil guiding slot 212 is a through hole. The structure in the implementation 4 is a combination of the structure in the implementation 3 and the structure in the implementation 2, and therefore is not shown in a form of a figure herein.

Implementation 5

Figure 21:
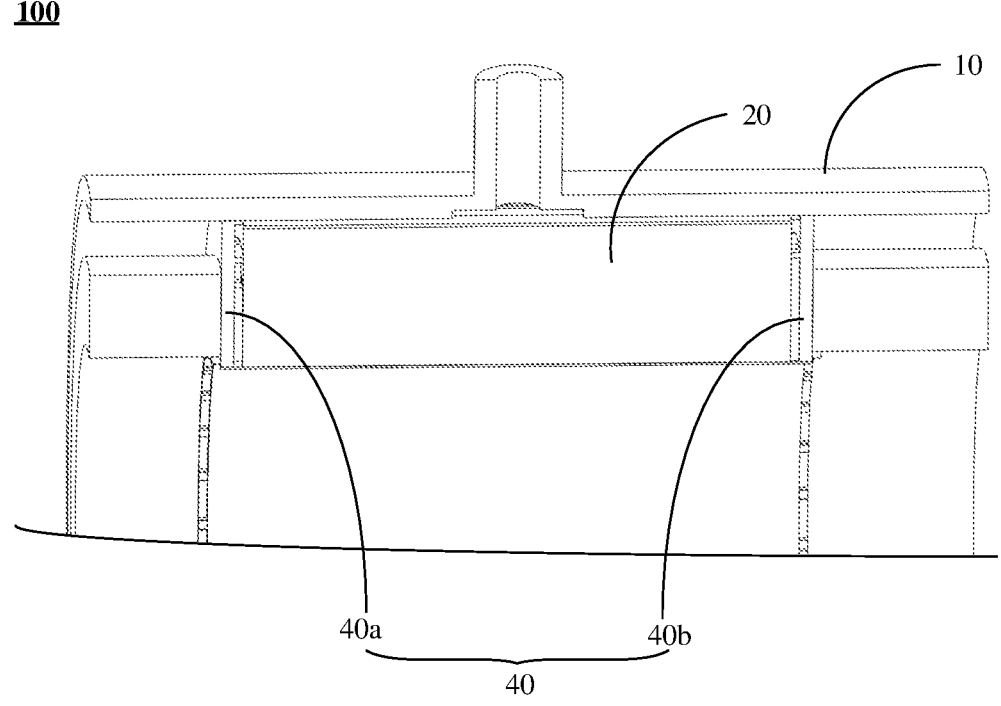
FIG. 21 is a sectional view of a stator according to an implementation 5.

FIG. 21 is a sectional view of the stator 100 according to the implementation 5. In a structure shown in FIG. 21, the stator 100 provided in the implementation 5 includes only one type of iron core punching sheet 20, and a structural design is simpler. Structural designs of the first oil guiding slot 211 and the second oil guiding slot 212 on the iron core punching sheet 20 are the same as those of the first oil guiding slot 211 and the second oil guiding slot 212 on the iron core punching sub-sheet 20a shown in the implementation 2 in FIG. 21. For example, referring to FIG. 21, each first oil guiding slot 211 is an open slot whose opening is located on the outer surface of the yoke part 21, and each second oil guiding slot 212 is an open slot whose opening is located on the inner surface of the yoke part 21. Corresponding to the structure of the iron core punching sheet 20, still referring to FIG. 21, the flow guiding assembly 40 includes a first end plate 40a and a second end plate 40b that are disposed opposite to each other, and each of the first end plate 40a and the second end plate 40b abuts against one side of the iron core punching sheet 20.

Figure 22:
FIG. 22 is a schematic diagram of a structure of an end plate according to an implementation 5.
Figure 22:
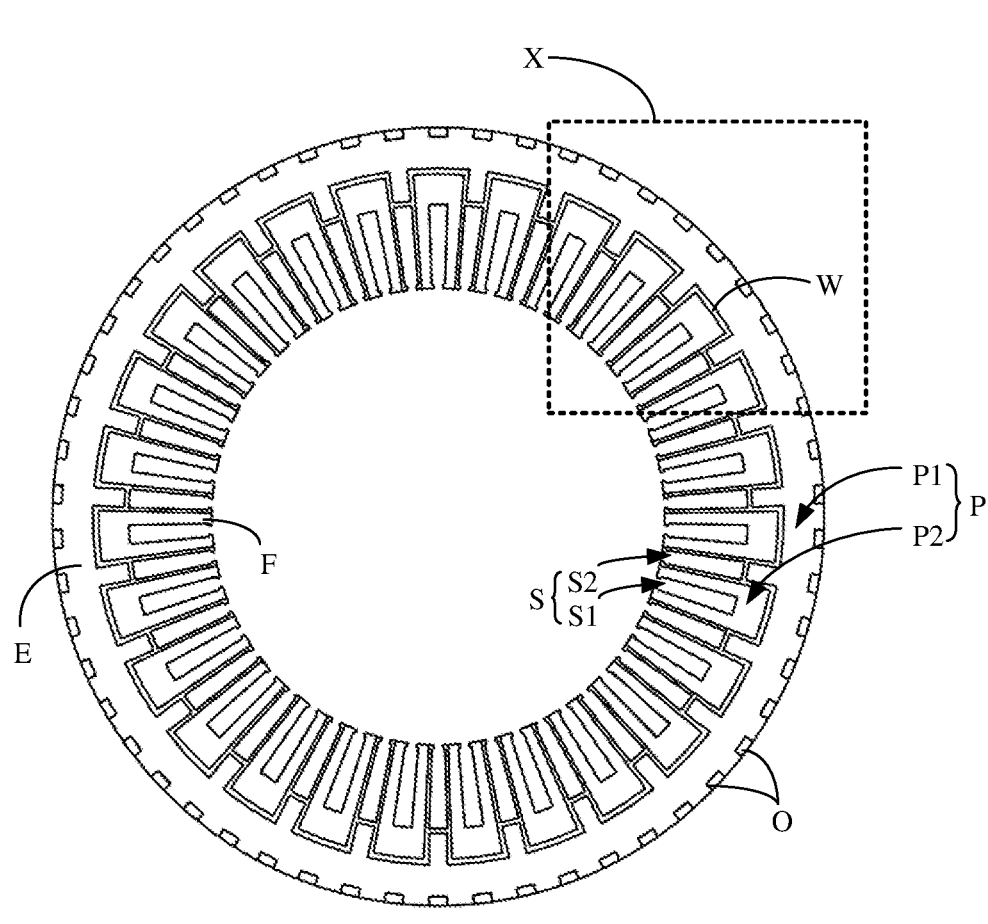
Figure 23:
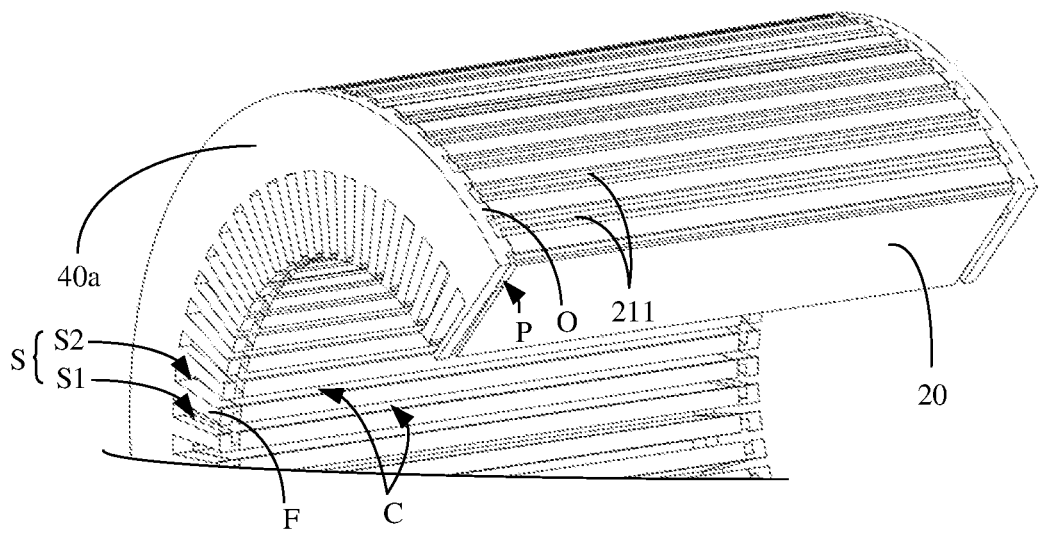
FIG. 23 is a diagram of a structure existing after the end plate in FIG. 22 and an iron core punching sheet are assembled.

It should be noted that a structure of the first end plate 40a is the same as that of the second end plate 40b. Herein, the structure of the first end plate 40a is used as an example to describe the structure of the end plate. In a structure shown in FIG. 22, the first end plate 40a includes a ring-shaped main body part E and a plurality of extension parts F. The main body part E corresponds to the yoke part 21 shown in FIG. 21, and a plurality of abutting blocks O are disposed on a side that is of the main body part E and that faces the iron core punching sheet 20. The plurality of abutting blocks O are evenly distributed on an outer side of the main body part E in the circumferential direction, to form a flow guiding space P between the first end plate 40a and the iron core punching sheet 20. FIG. 23 is a diagram of a structure existing after the first end plate 40a and the iron core punching sheet 20 are assembled. With reference to FIG. 22, referring to the structure shown in FIG. 23, to help the coolant oil to enter the flow guiding space P, each abutting block O abuts against a part that is of the iron core punching sheet 20 and that is between adjacent first oil guiding slots 211.

For a structural design of the extension part F, still referring to the structures shown in FIG. 22 and FIG. 23, the plurality of extension parts F is evenly distributed on an inner side of the main body part E in the circumferential direction, there is a notch between adjacent extension parts F, and each notch corresponds to one stator slot C shown in FIG. 21. For example, a plurality of notches formed by using the plurality of extension parts F may be classified into a first notch S1 and a second notch S2 shown in FIG. 22. The first notch S1 and the second notch S2 are alternately arranged in the circumferential direction.

In addition, still referring to the structure shown in FIG. 22, a separation structure W is further disposed on a side that is of each end plate and that faces the iron core punching sheet 20, and the separation structure W surrounds the first notch S1, to separate the flow guiding space P into a first flow guiding space P1 and a second flow guiding space P2. The first notch S1 is located in the second flow guiding space P2, the first flow guiding space P1 corresponds to the first cooling channel b1, and the second flow guiding space P2 corresponds to the second cooling channel b2.

Figure 24:
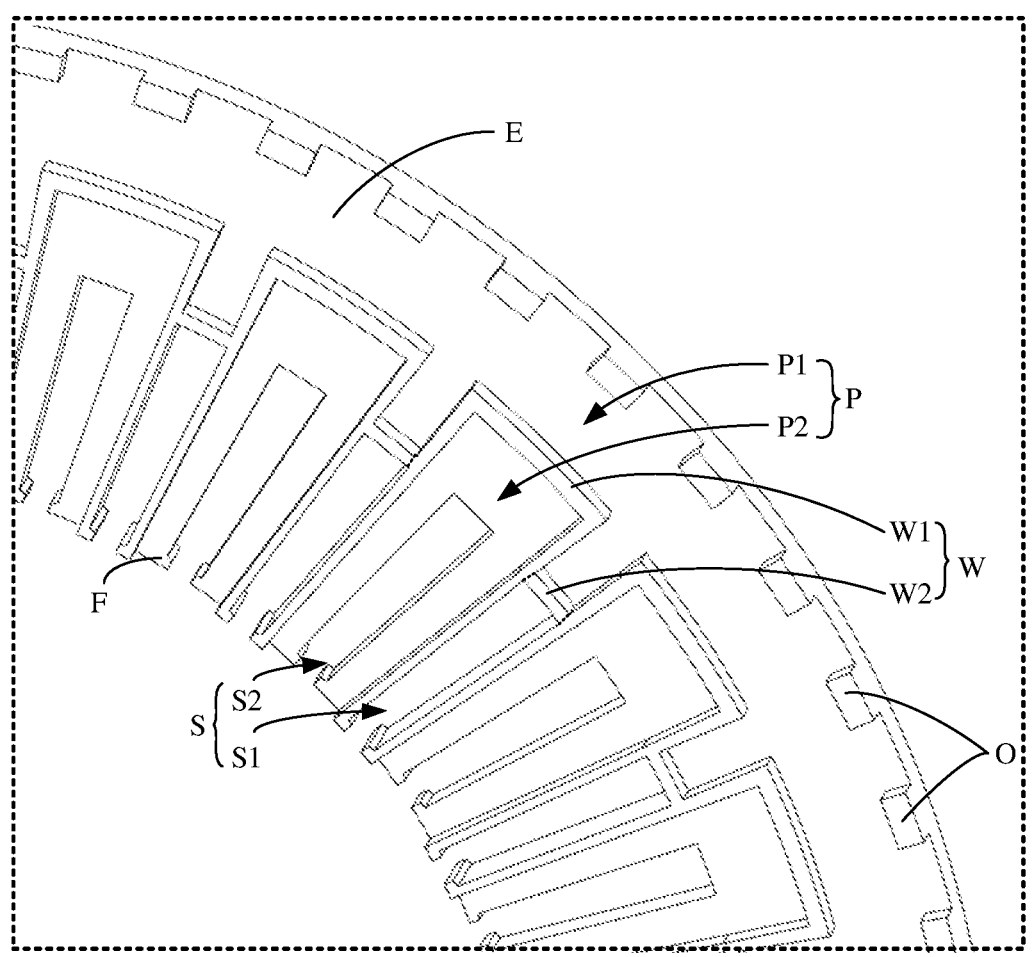
FIG. 24 is a three-dimensional enlarged view at X in FIG. 22.

FIG. 24 is a three-dimensional enlarged view at X in FIG. 22. For example, the separation structure W includes a first separation substructure W1 and a second separation substructure W2. It should be understood that to clearly show the first separation substructure W1 and the second separation substructure W2, a dashed line is used as an example herein for separation. For example, the first separation substructure W1 is disposed on the main body part E, and communicates with an end that is of two extension parts F that form the first notch S1 and that faces away from the main body part E, to form an independent second flow guiding space P2. The second separation substructure W2 is disposed on the main body part E, and is connected to the adjacent first separation substructure W1, to form the first flow guiding space P1 between an outer edge of the main body part E and each of the first separation substructure W1 and the second separation substructure W2.

Figure 25:
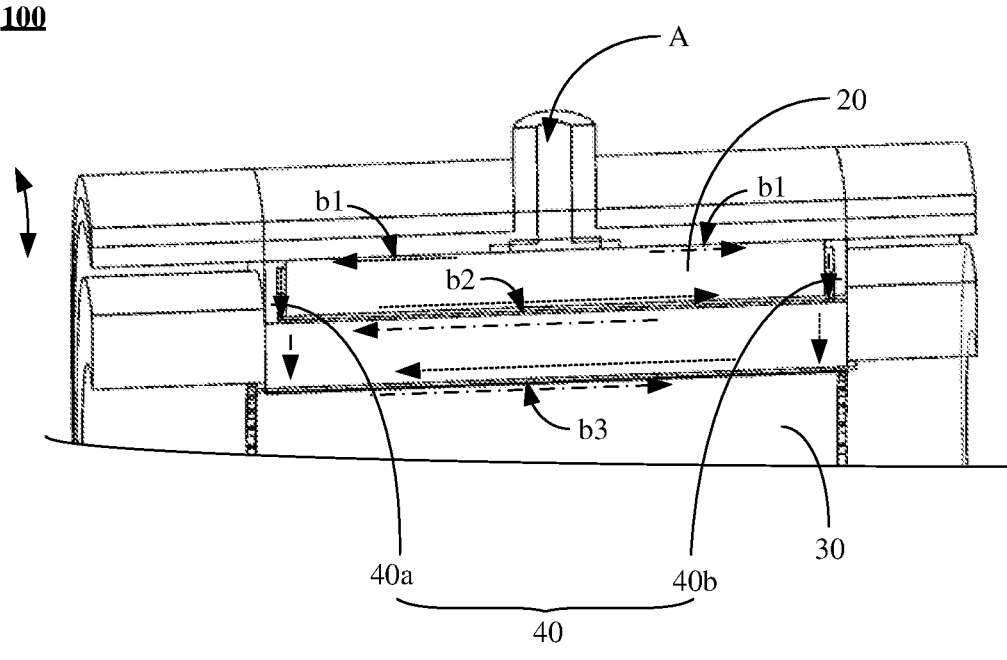
FIG. 25 is a schematic diagram of flow of coolant oil in a stator according to an implementation 5.

To clearly describe a flow direction of the coolant oil in the stator 100 in this implementation, refer to a structure shown in FIG. 25. First, it should be noted that in the structure shown in FIG. 25, for the first end plate 40a and the second end plate 40b, in the extension direction of the iron core punching sheet 20, there is a specific angle difference between the first end plate 40a and the second end plate 40b in the circumferential direction. For example, with reference to FIG. 22 and FIG. 23, referring to FIG. 25, the first notch S1 on the first end plate 40a communicates with a second notch S2 on the second end plate 40b. On this basis, in the extension direction of the iron core punching sheet 20, a first flow guiding space P1 in each of the first end plate 40a and the second end plate 40b communicates with a second flow guiding space P2 in the other end plate through the second cooling channel b2.

A flow direction of the coolant oil in the stator 100 in this implementation is as follows:

After flowing to the accommodation cavity from the oil inlet A, the coolant oil enters the first cooling channel b1 that includes the plurality of first oil guiding slots 211 and the inner wall of the housing 10. It should be understood that the first cooling channel b1 is not shown at a sectional angle, and FIG. 25 is merely an example for description. Then, the coolant oil flows from the middle of the iron core punching sheet 20 to two sides along the first cooling channel b1 (the flow direction is shown in a form of two lines). Then, the coolant oil flowing out of the first cooling channel b1 enters the first flow guiding space P1 in the first end plate 40a or the second end plate 40b. Then, the coolant oil flows from the first flow guiding space P1 to the second cooling channel b2. Then, the coolant oil flowing out of the second cooling channel b2 enters the second flow guiding space P2 between the end plate on the other side and the iron core punching sheet 20. Then, the coolant oil flows in the second flow guiding space P2.

It should be understood that when the coolant oil flows in the second flow guiding space P2, the coolant oil may flow in an extension direction of the extension part F. Each of the first notch S1 and the second notch S2 corresponds to one stator slot C, and each second flow guiding space P2 surrounds one first notch S1. Therefore, when the coolant oil flows in the second flow guiding space P2, the coolant oil may reach the slot opening of the stator slot C formed between the adjacent tooth parts 22. Then, the coolant oil flows along the third cooling channel b3 formed through fitting between the slot opening of the stator slot C and the spacer sleeve 30.

Figure 26:
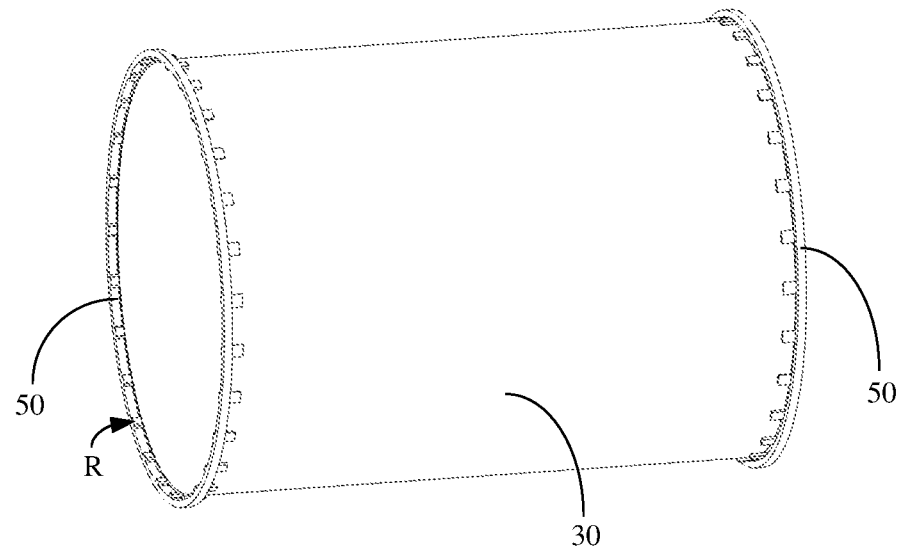
FIG. 26 is a schematic diagram of a structure of a fastening assembly according to an implementation 5.

It should be noted that to fasten the spacer sleeve 30, a fastening assembly may be further disposed. For example, as shown in FIG. 26, the disposed fastening assembly includes two fasteners 60 disposed opposite to each other. For example, an inner ring of each fastener 60 is disposed on a barrier block R configured to prevent the spacer sleeve 30 from moving in an extension direction.

Figure 27:
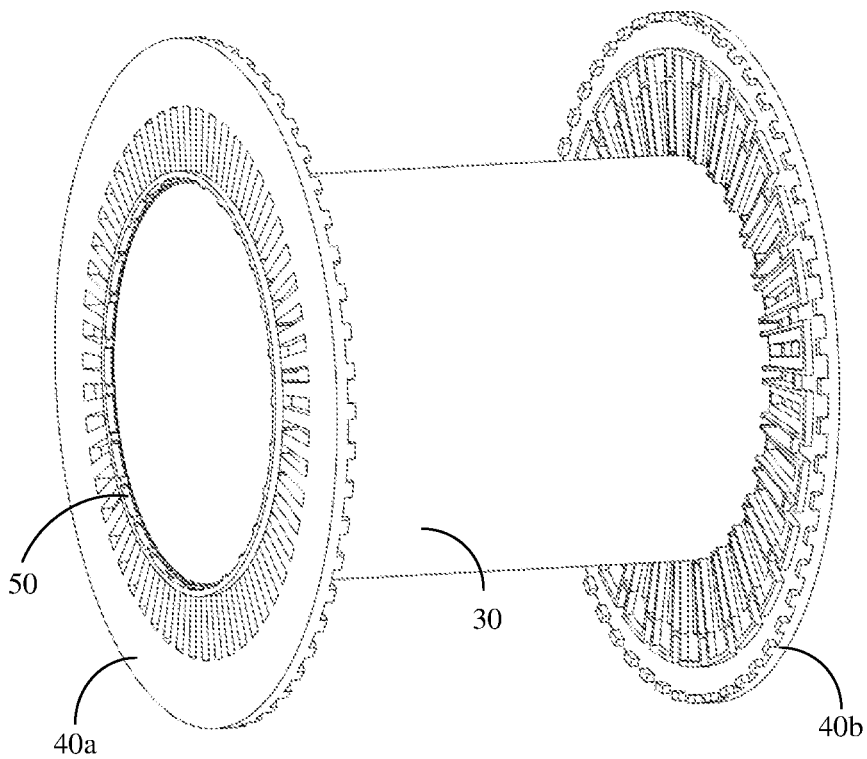
FIG. 27 is a diagram of a structure existing after the fastening assembly in FIG. 26 and an end plate are assembled.

FIG. 27 is a diagram of a structure existing after the fastening assembly and the end plate are assembled. In the structure shown in FIG. 27, each fastener 60 corresponds to one of the first end plate 40a or the second end plate 40b, and each fastener 60 is disposed on a side that is of the end plate corresponding to the fastener 60 and that faces away from the other end plate.

The separation structure W is not limited to the structure shown in FIG. 22, and there is another implementation.

Figure 28:
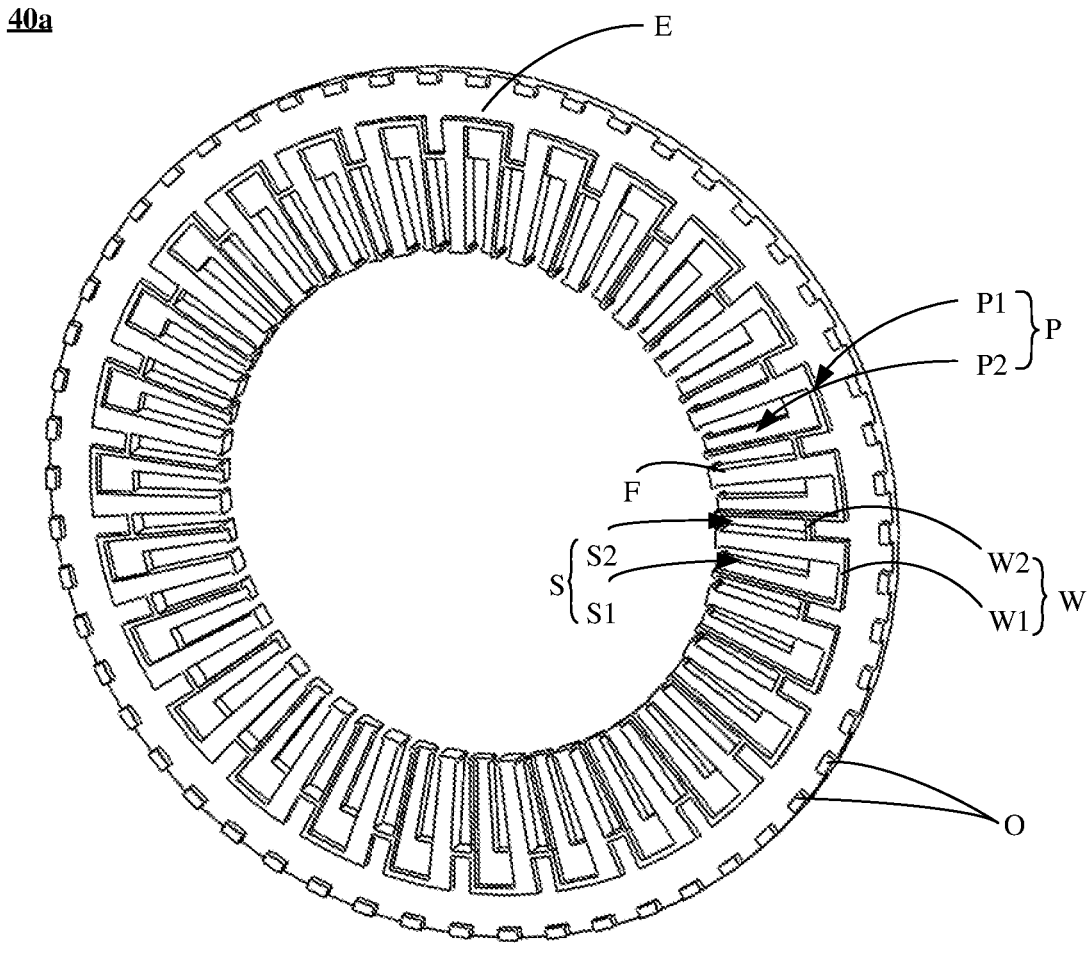
FIG. 28 is a schematic diagram of a structure of a separation structure according to an embodiment.

A possible implementation of the separation structure W is shown in FIG. 28. In FIG. 28, the first end plate 40a is used as an example for description. It should be noted that a difference between the first end plate 40a shown in FIG. 28 and the first end plate 40a shown in FIG. 16 lies in the first separation substructure W1 that surrounds the first notch S1. The first separation substructure W1 is connected to an entire extension part F between the first notch S1 and the second notch S2.

Figure 29:
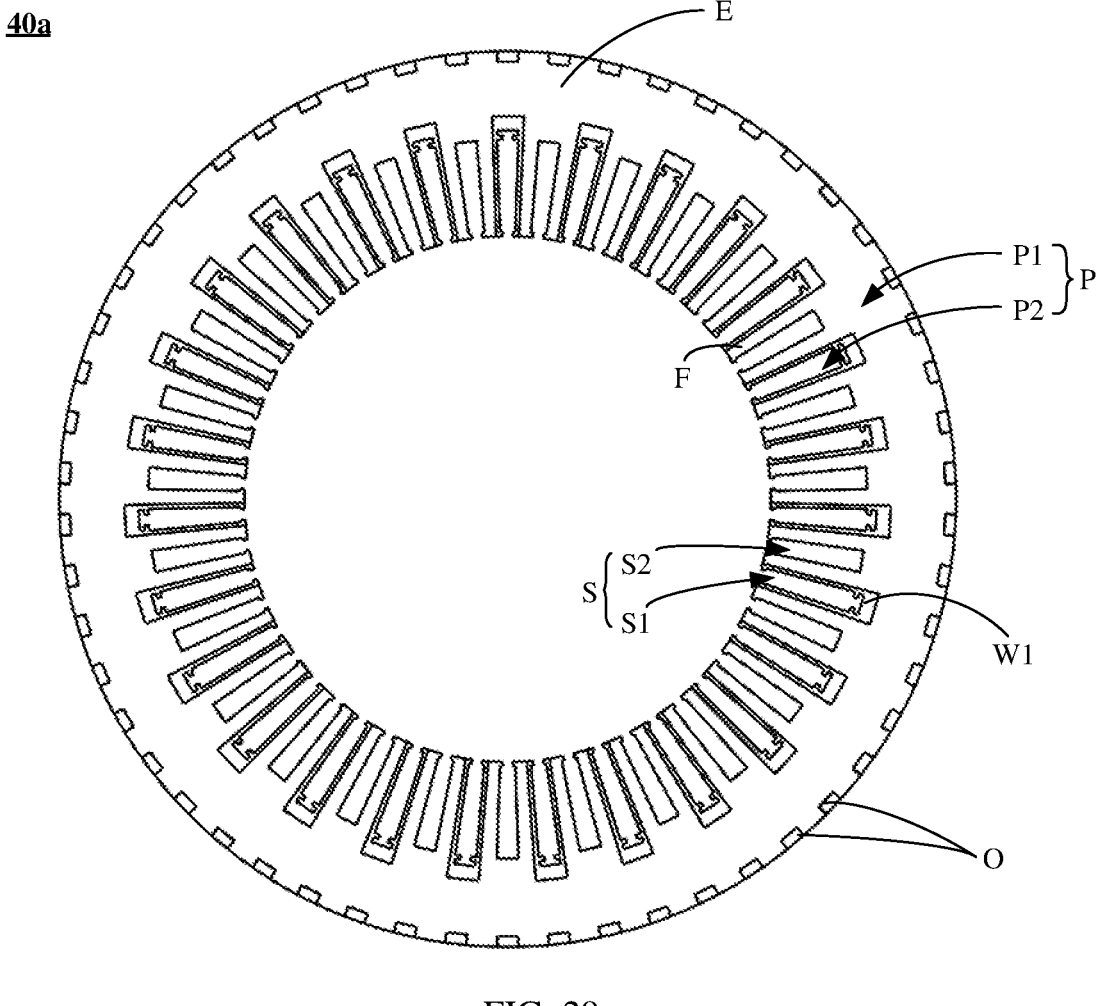
FIG. 29 is another schematic diagram of a structure of a separation structure according to an embodiment.

Another possible implementation of the separation structure W is shown in FIG. 29. It should be noted that a difference between the first end plate 40a shown in FIG. 29 and the first end plate 40a shown in FIG. 16 lies in that the separation structure W includes only the first separation substructure W1 that surrounds the first notch S1. The first separation substructure W1 is connected to two extension parts F on two sides of the first notch S1 and is connected only to parts that are of the two extension parts F and that are close to the first notch S1.

Figure 30:
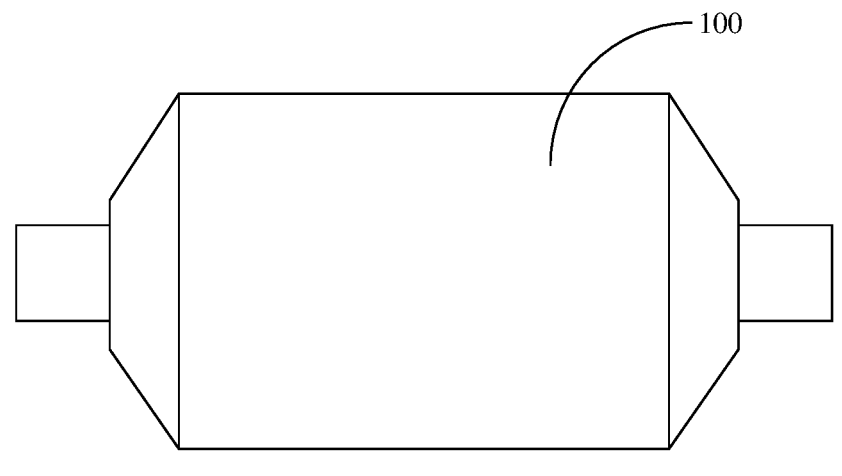
FIG. 30 is a schematic diagram of a structure of a motor according to an embodiment.

According to a second aspect, an embodiment further provides a motor 200. In a structure shown in FIG. 30, the motor 200 includes a rotor and any stator 100 provided in the solution in the first aspect. It should be understood that the rotor fits with the stator 100 to perform a function.

In the motor 200 provided in this embodiment, a first cooling channel b1, a second cooling channel b2, and a third cooling channel b3 are disposed in the stator 100. When coolant oil flows along the first cooling channel b1, the second cooling channel b2, and the third cooling channel b3, the coolant oil flowing out of an oil inlet A first flows through the first cooling channel b1 on an outer surface of the stator 100 to preliminarily cool the stator 100. Then, the coolant oil enters the second cooling channel b2, and the coolant oil located in the second cooling channel b2 cools the stator 100 again. Finally, the coolant oil enters the third cooling channel b3, and cools the stator 100 for a third time. A cooling requirement of the motor 200 in a low-speed and high-torque working condition and a high-rotation-speed working condition can be ensured by using the three-layer oil-injection design.

Figure 31:
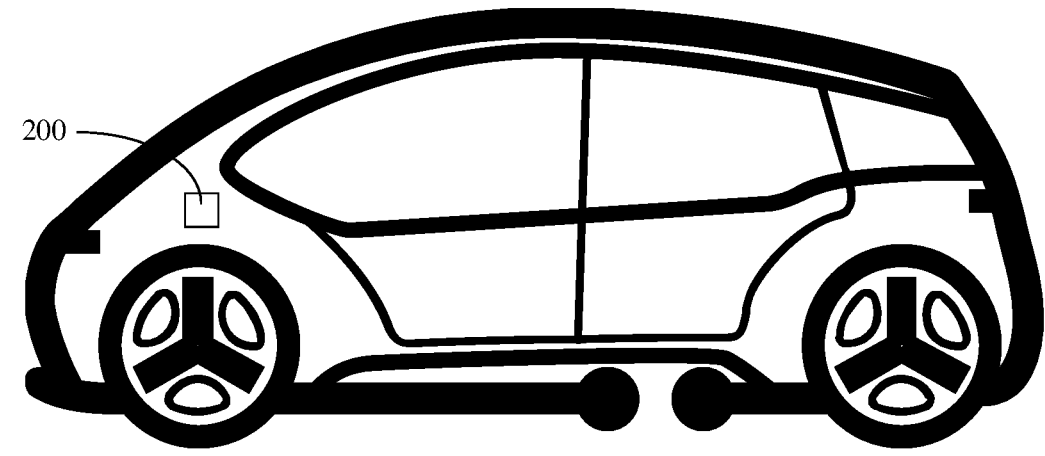
FIG. 31 is a schematic diagram of a structure of an electric vehicle according to an embodiment.

According to a third aspect, an embodiment further provides an electric vehicle 300. FIG. 31 shows a structure of the electric vehicle 300. As shown in FIG. 21, the motor 200 provided in the solution in the second aspect is applied to the electric vehicle 300. The motor 200 in the electric vehicle 300 is in line with a current trend of a high speed and miniaturization of the motor 200.

The foregoing descriptions are merely specific implementations of the embodiments, but the scope of the embodiments is not limited thereto. Any variation or replacement readily figured out by a person skilled in the art shall fall within the scope of embodiments.

What is claimed is:

1. A stator, comprising:
a housing having an accommodation space and an oil inlet that communicates with the accommodation space and is disposed on the housing;
a ring-shaped iron core punching sheet disposed in the accommodation space that abuts against an inner wall of the housing, wherein the ring-shaped iron core punching sheet comprises:
a yoke part and a plurality of tooth parts that is evenly distributed on an inner side of the yoke part in a circumferential direction, a stator slot is disposed between adjacent tooth parts of the plurality of tooth parts, a first cooling channel is disposed between an outer edge of the yoke part and the housing, the first cooling channel communicates with the oil inlet, a second cooling channel is disposed on an inner edge of the yoke part, and the second cooling channel is located between adjacent tooth parts of the plurality of tooth parts;
a spacer sleeve that is sleeved in the ring-shaped iron core punching sheet, wherein an outer surface of the spacer sleeve abuts against a side of each tooth part of the plurality of tooth parts that faces away from the yoke part, and a slot opening of the stator slot fits with the spacer sleeve to form a third cooling channel;
a flow guiding assembly comprising two end plates and an intermediate flow guiding member that is disposed in the accommodation space and configured to guide, in a direction from the first cooling channel to the second cooling channel and then to the third cooling channel, coolant oil flowing out of the oil inlet;
each first oil guiding slot is an open slot whose opening is located on an outer surface of the yoke part, and each second oil guiding slot is an open slot whose opening is located on an inner surface of the yoke part;
each first oil guiding slot is an open slot whose opening is located on an outer surface of the yoke part, and each second oil guiding slot is a through hole disposed on the yoke part;
each first oil guiding slot is a through hole disposed on the yoke part, and each second oil guiding slot is an open slot whose opening is located on an inner surface of the yoke part; or

each first oil guiding slot and each second oil guiding slot are through holes disposed on the yoke part.

2. The stator according to claim 1, wherein in an extension direction of the housing, the oil inlet is located on a side part of the housing, and the oil inlet is located between end faces on two sides of the ring-shaped iron core punching sheet.

3. The stator according to claim 2, wherein the first cooling channel comprises a plurality of first oil guiding slots disposed on the outer edge of the yoke part, each first oil guiding slot penetrates through the ring-shaped iron core punching sheet in an extension direction of the ring-shaped iron core punching sheet, the second cooling channel comprises a plurality of second oil guiding slots disposed on the inner edge of the yoke part, each second oil guiding slot penetrates through the ring-shaped iron core punching sheet in the extension direction of the ring-shaped iron core punching sheet, and each second oil guiding slot corresponds to one stator slot.

4. The stator according to claim 1, wherein the ring-shaped iron core punching sheet comprises two iron core punching sub-sheets, the two end plates are disposed opposite to each other, each end plate abuts against one end of the ring-shaped iron core punching sheet, a flow guiding slot is disposed on a side of each end plate that faces the ring-shaped iron core punching sheet, and the flow guiding slot communicates with the first cooling channel and the second cooling channel; and
the intermediate flow guiding member is of a ring-shaped structure, the intermediate flow guiding member abuts between the two iron core punching sub-sheets, and corresponds to a position of the oil inlet, an outer edge of the intermediate flow guiding member does not go beyond a slot bottom of the first oil guiding slot, and an inner edge of the intermediate flow guiding member does not go beyond an outer edge of the second oil guiding slot.

5. The stator according to claim 1, wherein
when each first oil guiding slot is an open slot whose opening is located on the outer surface of the yoke part, and each second oil guiding slot is an open slot whose opening is located on the inner surface of the yoke part, the two end plates comprise a first end plate and a second end plate that are disposed opposite to each other; and in the first end plate and the second end plate, each end plate abuts against one side of the ring-shaped iron core punching sheet, a flow guiding space is formed between each end plate and the ring-shaped iron core punching sheet, each end plate comprises a ring-shaped main body part and a plurality of extension parts, the ring-shaped main body part corresponds to the yoke part of the ring-shaped iron core punching sheet, a plurality of abutting blocks is evenly distributed in the circumferential direction and is disposed on a side of the ring-shaped main body part that faces the ring-shaped iron core punching sheet, each abutting block abuts against a part between adjacent first oil guiding slots, so that the flow guiding space communicates with the first cooling channel, the plurality of extension parts is evenly distributed on an inner side of the ring-shaped main body part in the circumferential direction, there is a notch between adjacent extension parts, each notch of a plurality of notches is formed by using the plurality of extension parts corresponds to one stator slot, the plurality of notches comprises a first notch and a second notch that are alternately arranged in the circumferential direction, a separation structure is further disposed on a side of each end plate that faces the ring-shaped iron core punching sheet, the separation structure surrounds the first notch, to separate the flow guiding space into a first flow guiding space and a second flow guiding space, the first notch is located in the second flow guiding space, the first flow guiding space communicates with the first cooling channel, and the second flow guiding space communicates with the second cooling channel; and in the extension direction of the ring-shaped iron core punching sheet, the first flow guiding space in each end plate communicates with a second flow guiding space in the other end plate through the second oil guiding slot.

6. The stator according to claim 5, wherein the separation structure comprises a first separation substructure and a second separation substructure;

the first separation substructure is connected to an end that comprises extension parts of the plurality of extension parts on two sides of the first notch and that faces away from the main body part, the first separation substructure is partially located on the main body part, and there is a spacing between a part of the first separation substructure that is located on the main body part and an inner edge of the main body part; and the second separation substructure is disposed on the inner edge of the main body part and is connected to the adjacent first separation substructure.

7. The stator according to claim 5, wherein the separation structure comprises a first separation substructure, the first separation substructure is connected to an end that comprises extension parts of the plurality of extension parts on two sides of the first notch and that faces away from the main body part, and the first separation substructure is partially located on the main body part.

8. The stator according to claim 1, further comprising:

a fastening assembly configured to fasten the spacer sleeve, wherein the fastening assembly comprises two fasteners disposed opposite to each other, each fastener corresponds to one end plate, and each fastener is disposed on a side of the end plate corresponding to the fastener that faces away from the other end plate.

9. A motor comprising:

a rotor; and a stator, wherein the rotor fits with the stator, and the stator comprises:

a housing, wherein the housing has an accommodation space and an oil inlet that communicates with the accommodation space and is disposed on the housing;

a ring-shaped iron core punching sheet disposed in the accommodation space that abuts against an inner wall of the housing, wherein the ring-shaped iron core punching sheet comprises:

a yoke part and a plurality of tooth parts that is evenly distributed on an inner side of the yoke part in a circumferential direction, a stator slot is disposed between adjacent tooth parts of the plurality of tooth parts, a first cooling channel is disposed between an outer edge of the yoke part and the housing, the first cooling channel communicates with the oil inlet, a second cooling channel is disposed on an inner edge of the yoke part, and the second cooling channel is located between adjacent tooth parts of the plurality of tooth parts;

a spacer sleeve that is sleeved in the ring-shaped iron core punching sheet, wherein an outer surface of the spacer sleeve abuts against a side of each tooth part of the plurality of tooth parts that faces away from the yoke part, and a slot opening of the stator slot fits with the spacer sleeve to form a third cooling channel; and a flow guiding assembly comprising two end plates and an intermediate flow guiding member that is disposed in the accommodation space, and is configured to guide, in a direction from the first cooling channel to the second cooling channel and then to the third cooling channel, coolant oil flowing out of the oil inlet;

each first oil guiding slot is an open slot whose opening is located on an outer surface of the yoke part, and each second oil guiding slot is an open slot whose opening is located on an inner surface of the yoke part;

each first oil guiding slot is an open slot whose opening is located on an outer surface of the yoke part, and each second oil guiding slot is a through hole disposed on the yoke part;

each first oil guiding slot is a through hole disposed on the yoke part, and each second oil guiding slot is an open slot whose opening is located on an inner surface of the yoke part; or each first oil guiding slot and each second oil guiding slot are through holes disposed on the yoke part.

10. The motor according to claim 9, wherein in an extension direction of the housing, the oil inlet is located on a side part of the housing, and the oil inlet is located between end faces on two sides of the ring-shaped iron core punching sheet.

11. The motor according to claim 9, wherein the first cooling channel comprises a plurality of first oil guiding slots disposed on the outer edge of the yoke part, each first oil guiding slot penetrates through the ring-shaped iron core punching sheet in an extension direction of the ring-shaped iron core punching sheet, the second cooling channel comprises a plurality of second oil guiding slots disposed on the inner edge of the yoke part, each second oil guiding slot penetrates through the ring-shaped iron core punching sheet in the extension direction of the ring-shaped iron core punching sheet, and each second oil guiding slot corresponds to one stator slot.

12. The motor according to claim 9, wherein the ring-shaped iron core punching sheet comprises two iron core punching sub-sheets; the two end plates are disposed opposite to each other, each end plate abuts against one end of the ring-shaped iron core punching sheet, a flow guiding slot is disposed on a side of each end plate that faces the ring-shaped iron core punching sheet, and the flow guiding slot communicates with the first cooling channel and the second cooling channel; and the intermediate flow guiding member is of a ring-shaped structure, the intermediate flow guiding member abuts between the two iron core punching sub-sheets, and corresponds to a position of the oil inlet, an outer edge of the intermediate flow guiding member does not go beyond a slot bottom of the first oil guiding slot, and an inner edge of the intermediate flow guiding member does not go beyond an outer edge of the second oil guiding slot.

13. The motor according to claim 9, wherein when each first oil guiding slot is an open slot whose opening is located on the outer surface of the yoke part, and each second oil guiding slot is an open slot whose opening is located on the inner surface of the yoke part, the two end plates comprise a first end plate and a second end plate that are disposed opposite to each other; and in the first end plate and the second end plate, each end plate abuts against one side of the ring-shaped iron core punching sheet, a flow guiding space is formed between each end plate and ring-shaped the iron core punching sheet, each end plate comprises a ring-shaped main body part and a plurality of extension parts, the main body part corresponds to the yoke part of the ring-shaped iron core punching sheet, a plurality of abutting blocks is evenly distributed in the circumferential direction are disposed on a side of the main body part that faces the ring-shaped iron core punching sheet, each abutting block abuts against a part between adjacent first oil guiding slots, so that the flow guiding space communicates with the first cooling channel, the plurality of extension parts is evenly distributed on an inner side of the main body part in the circumferential direction, there is a notch between adjacent extension parts, each notch of a plurality of notches is formed by using the plurality of extension parts corresponds to one stator slot, the plurality of notches comprises a first notch and a second notch that are alternately arranged in the circumferential direction, a separation structure is further disposed on a side of each end plate that faces the ring-shaped iron core punching sheet, the separation structure surrounds the first notch, to separate the flow guiding space into a first flow guiding space and a second flow guiding space, the first notch is located in the second flow guiding space, the first flow guiding space communicates with the first cooling channel, and the second flow guiding space communicates with the second cooling channel; and in the extension direction of the ring-shaped iron core punching sheet, the first flow guiding space in each end plate communicates with a second flow guiding space in the other end plate through the second oil guiding slot.

14. The motor according to claim 13, wherein the separation structure comprises a first separation substructure and a second separation substructure;

the first separation substructure is connected to an end of the plurality of extension parts on two sides of the first notch that faces away from the main body part, the first separation substructure is partially located on the main body part, and there is a spacing between a part of the first separation substructure that is located on the main body part and an inner edge of the main body part; and the second separation substructure is disposed on the inner edge of the main body part and is connected to the adjacent first separation substructure.

15. The motor according to claim 13, wherein the separation structure comprises a first separation substructure, the first separation substructure is connected to an end of the plurality of extension parts on two sides of the first notch that faces away from the main body part, and the first separation substructure is partially located on the main body part.

16. The motor according to claim 9, wherein the rotor further comprises a fastening assembly, configured to fasten the spacer sleeve, wherein the fastening assembly comprises two fasteners disposed opposite to each other, each fastener corresponds to one end plate, and each fastener is disposed on a side of the end plate corresponding to the fastener that faces away from the other end plate.

17. An electric vehicle, comprising a motor, wherein the motor comprises a rotor and a stator, wherein the stator comprises:

a housing having an accommodation space and an oil inlet that communicates with the accommodation space and is disposed on the housing;

a ring-shaped iron core punching sheet disposed in the accommodation space that abuts against an inner wall of the housing, wherein the ring-shaped iron core punching sheet comprises:

a yoke part and a plurality of tooth parts that is evenly distributed on an inner side of the yoke part in a circumferential direction, a stator slot is disposed between adjacent tooth parts of the plurality of tooth parts, a first cooling channel is disposed between an outer edge of the yoke part and the housing, the first cooling channel communicates with the oil inlet, a second cooling channel is disposed on an inner edge of the yoke part, and the second cooling channel is located between adjacent tooth parts of the plurality of tooth parts;

a spacer sleeve that is sleeved in the ring-shaped iron core punching sheet, wherein an outer surface of the spacer sleeve abuts against a side of each tooth part of the plurality of tooth parts that faces away from the yoke part, and a slot opening of the stator slot fits with the spacer sleeve to form a third cooling channel;

a flow guiding assembly comprising two end plates and an intermediate flow guiding member that is disposed in the accommodation space, and is configured to guide, in a direction from the first cooling channel to the second cooling channel and then to the third cooling channel, coolant oil flowing out of the oil inlet;

each first oil guiding slot is an open slot whose opening is located on an outer surface of the yoke part, and each second oil guiding slot is an open slot whose opening is located on an inner surface of the yoke part;

each first oil guiding slot is an open slot whose opening is located on an outer surface of the yoke part, and each second oil guiding slot is a through hole disposed on the yoke part;

each first oil guiding slot is a through hole disposed on the yoke part, and each second oil guiding slot is an open slot whose opening is located on an inner surface of the yoke part; or each first oil guiding slot and each second oil guiding slot are through holes disposed on the yoke part.

* * * * *